United States Patent
Tsai et al.

(10) Patent No.: US 11,276,177 B1
(45) Date of Patent: Mar. 15, 2022

(54) SEGMENTATION FOR IMAGE EFFECTS

(71) Applicant: QUALCOMM Incorporated, San Diego, CA (US)

(72) Inventors: Chung-Chi Tsai, San Diego, CA (US); Sreevatsan Madhavan, San Diego, CA (US); Shang-Chih Chuang, San Diego, CA (US); Kuang-Jui Hsu, Hsinchu (TW); Venkata Ravi Kiran Dayana, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/063,541

(22) Filed: Oct. 5, 2020

(51) Int. Cl.
*G06T 7/174* (2017.01)
*G06T 7/194* (2017.01)
*G06T 5/00* (2006.01)
*G06T 5/50* (2006.01)
*G06T 3/40* (2006.01)
*H04N 5/247* (2006.01)

(52) U.S. Cl.
CPC .............. *G06T 7/174* (2017.01); *G06T 3/40* (2013.01); *G06T 5/002* (2013.01); *G06T 5/50* (2013.01); *G06T 7/194* (2017.01); *G06T 2207/10048* (2013.01); *G06T 2207/20081* (2013.01); *G06T 2207/20084* (2013.01); *G06T 2207/20092* (2013.01); *G06T 2207/20132* (2013.01); *G06T 2207/20221* (2013.01); *H04N 5/247* (2013.01)

(58) Field of Classification Search
CPC .......... G06T 7/174; G06T 3/40; G06T 5/002; G06T 5/50; G06T 7/194; G06T 2207/10048; G06T 2207/20081; G06T 2207/20084; G06T 2207/20092; G06T 2207/20132; G06T 2207/20221; H04N 5/247
See application file for complete search history.

(56) References Cited

U.S. PATENT DOCUMENTS

| | | | | |
|---|---|---|---|---|
| 10,298,864 B2 * | 5/2019 | Li | ............................. | G06T 5/50 |
| 10,504,274 B2 * | 12/2019 | Du | .......................... | G06T 15/04 |
| 10,839,517 B2 * | 11/2020 | Takeda | .................. | G06N 3/0454 |
| 10,997,433 B2 * | 5/2021 | Xu | ..................... | G06K 9/00718 |
| 2016/0292842 A1 * | 10/2016 | Pylkkanen | ................ | G06T 7/11 |

* cited by examiner

*Primary Examiner* — Phuoc Tran
(74) *Attorney, Agent, or Firm* — Qualcomm Incorporated

(57) ABSTRACT

Systems, methods, and computer-readable media are provided for foreground image segmentation. In some examples, a method can include obtaining a first image of a target and a second image of the target, the first image having a first field-of-view (FOV) and the second image having a second FOV; determining, based on the first image, a first segmentation map that identifies a first estimated foreground region in the first image; determining, based on the second image, a second segmentation map that identifies a second estimated foreground region in the second image; generating a third segmentation map based on the first segmentation map and the second segmentation map; and generating, using the second segmentation map and the third segmentation map, a refined segmentation mask that identifies the target as a foreground region of the first and/or second image.

30 Claims, 8 Drawing Sheets

SEGMENTATION FOR IMAGE EFFECTS

TECHNICAL FIELD

The present disclosure generally relates to image processing, and more specifically to segmentation for image effects.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

Many image processing techniques implemented rely on image segmentation algorithms that divide an image into multiple segments which can be analyzed or processed to produce specific image effects. Some example practical applications of image segmentation include, without limitation, chroma key compositing, feature extraction, recognition tasks (e.g., object recognition, face recognition, etc.), image stylization, machine vision, medical imaging, and depth-of-field (or "bokeh") effects, among others. However, camera devices and image segmentation techniques often yield poor and inconsistent results and, in many cases, are only suitable for a specific type of image.

BRIEF SUMMARY

Disclosed herein are systems, methods, and computer-readable media for accurate image segmentation and image effects. According to at least one example, a method is provided for foreground prediction. An example method can include obtaining a first image of a target and a second image of the target, the first image having a first field-of-view (FOV) and the second image having a second FOV that is different than the first FOV; determining, based on the first image, a first segmentation map including foreground prediction values associated with a first estimated foreground region in the first image; determining, based on the second image, a second segmentation map comprising foreground prediction values associated with a second estimated foreground region in the second image; generating a third segmentation map based on the first segmentation map and the second segmentation map; and generating, using the second segmentation map and the third segmentation map, a refined segmentation mask that identifies at least a portion of the target as a foreground region of the first image and/or the second image.

According to at least some examples, apparatuses are provided for foreground prediction. In one example, an example apparatus can include memory and one or more processors configured to obtain a first image of a target and a second image of the target, the first image having a first field-of-view (FOV) and the second image having a second FOV that is different than the first FOV; determine, based on the first image, a first segmentation map including foreground prediction values associated with a first estimated foreground region in the first image; determine, based on the second image, a second segmentation map comprising foreground prediction values associated with a second estimated foreground region in the second image; generate a third segmentation map based on the first segmentation map and the second segmentation map; and generate, using the second segmentation map and the third segmentation map, a refined segmentation mask that identifies at least a portion of the target as a foreground region of the first image and/or the second image.

According to at least some examples, another example apparatus can include means for obtaining a first image of a target and a second image of the target, the first image having a first field-of-view (FOV) and the second image having a second FOV that is different than the first FOV; determining, based on the first image, a first segmentation map including foreground prediction values associated with a first estimated foreground region in the first image; determining, based on the second image, a second segmentation map comprising foreground prediction values associated with a second estimated foreground region in the second image; generating a third segmentation map based on the first segmentation map and the second segmentation map; and generating, using the second segmentation map and the third segmentation map, a refined segmentation mask that identifies at least a portion of the target as a foreground region of the first image and/or the second image.

According to at least one example, non-transitory computer-readable media are provided for foreground prediction. An example non-transitory computer-readable medium can store instructions that, when executed by one or more processors, cause the one or more processors to obtain a first image of a target and a second image of the target, the first image having a first field-of-view (FOV) and the second image having a second FOV that is different than the first FOV; determine, based on the first image, a first segmentation map including foreground prediction values associated with a first estimated foreground region in the first image; determine, based on the second image, a second segmentation map comprising foreground prediction values associated with a second estimated foreground region in the second image; generate a third segmentation map based on the first segmentation map and the second segmentation map; and generate, using the second segmentation map and the third segmentation map, a refined segmentation mask that identifies at least a portion of the target as a foreground region of the first image and/or the second image.

In some aspects, the methods, apparatuses, and non-transitory computer-readable medium described above can include generating an edited image based on the refined segmentation mask. In some examples, the edited image can be based on the first image or the second image. In some cases, the edited image can include a visual effect, an extended reality effect, an image processing effect, a blurring effect, an image recognition effect, a segmentation effect, a computer graphics effect, a chroma keying effect, and/or an image stylization effect. In an illustrative example, the edited image can include a blurring effect.

In some cases, generating the edited image can include applying, based on the refined segmentation mask, the blurring effect to one or more image regions located outside of the foreground region, wherein the blurring effect includes a depth-of-field effect where the one or more image regions are at least partly blurred and the foreground region is at least partly in focus.

In some examples, generating the refined segmentation mask can include generating a fused segmentation map by fusing the second segmentation map and the third segmentation map; and generating the refined segmentation mask based on the fused segmentation map. In some cases, fusing the second segmentation map and the third segmentation map can include averaging the foreground prediction values in the second segmentation map and foreground prediction values in the third segmentation map. In some examples, the fused segmentation map can include the averaged foreground prediction values.

In some cases, generating the fused segmentation map can include fusing the second segmentation map and the third segmentation map and multiplying a center prior map with an output of the fusing of the second segmentation map and the third segmentation map.

In some cases, the first image can be received from a first camera and the second image can be received from a second camera. In some examples, the first camera can be responsive to visible light and the second camera can be responsive to infrared light. In some cases, the apparatus described above can include the first camera and the second camera. In other cases, the first image and the second image can be received from a same camera. In some examples, the apparatus described above can include the same camera.

In some aspects, the methods, apparatuses, and non-transitory computer-readable medium described above can include determining, based on a third image, a fourth segmentation map including foreground values associated with a third estimated foreground region in the third image. In some cases, the third image can be received from a third camera. For example, the first image can be received from a first camera, the second image can be received from a second camera, and the third image can be received from a third camera.

In some examples, the apparatuses described above can be configured to generate segmentation masks in response to a user selection of an imaging mode (e.g., portrait mode, green screening, etc.).

In some aspects, the methods, apparatuses, and non-transitory computer-readable medium described above can include calculating foreground probabilities for superpixels in the first image and/or the second image, and generating the center prior map based on the foreground probabilities. In some cases, each foreground probability can be calculated based on a distance of an associated superpixel to an image center.

In some examples, generating the third segmentation map can include cropping the first segmentation map to a size of the second image, and after cropping the first segmentation map, upsampling the first segmentation map according to a resolution of the second image.

In some cases, determining the first segmentation map can include extracting superpixels from the first image; generating a set of image queries, each image query comprising the extracted superpixels, wherein each image query has a different border region of superpixels marked by one or more distinguishing pixel attributes; generating a set of segmentation probability maps based on the set of image queries, wherein a segmentation probability map of each image query is generated using one or more manifold ranking functions to estimate foreground probabilities at least partly based on a difference between the different border region of superpixels and one or more other regions of superpixels associated with each image query; and generating the first segmentation map by multiplying the set of segmentation probability maps.

In some examples, determining the second segmentation map can include extracting superpixels from the second image; generating an additional set of image queries, each additional image query of the additional set of image queries comprising the extracted superpixels from the second image, wherein each additional image query has the different border region of superpixels marked by the one or more distinguishing pixel attributes; generating an additional set of segmentation probability maps based on the additional set of image queries, wherein an additional segmentation probability map of each additional image query is generated using the one or more manifold ranking functions to estimate foreground probabilities at least partly based on an additional difference between the different border region of superpixels and one or more other regions of superpixels associated with the additional image query; and generating the second segmentation map by multiplying the additional set of segmentation probability maps.

In some examples, the first segmentation map and the second segmentation map can be generated using a deep neural network. In some examples, the first segmentation map and the second segmentation map can be generated using a trained neural network. In some cases, the trained neural network can include a deep neural network. In some cases, the first image and the second image are captured using different lenses having different FOVs. In some examples, the different lenses can include a telephoto lens, a wide-angle lens, an ultra-wide-angle lens, a standard lens, and/or a zoom lens.

In some cases, the first image and the second image can be captured using different image capturing devices or cameras having different FOVs. In other cases, the first image and the second image can be captured using a single image capturing device or camera having different FOVs.

In some cases, the apparatuses described above can be and/or can include a mobile phone, a smart wearable device, a portable computer, and/or a camera. In some cases, the apparatuses described above can include an image sensor and/or a display. In some examples, each apparatus described above can include one or more cameras. For example, each apparatus can include different cameras having different FOVs. As another example, each apparatus can include a camera having different FOVs.

This summary is not intended to identify key or essential features of the claimed subject matter and is not intended to be used in isolation to determine the scope of the claimed subject matter. The subject matter should be understood by reference to appropriate portions of the entire specification of this disclosure, the drawings, and the claims.

The preceding, together with other features and embodiments, will become more apparent upon referring to the following specification, claims, and accompanying drawings.

BRIEF DESCRIPTION OF THE DRAWINGS

Illustrative examples of the present application are described in detail below with reference to the following drawing figures.

DETAILED DESCRIPTION

Figure 1:
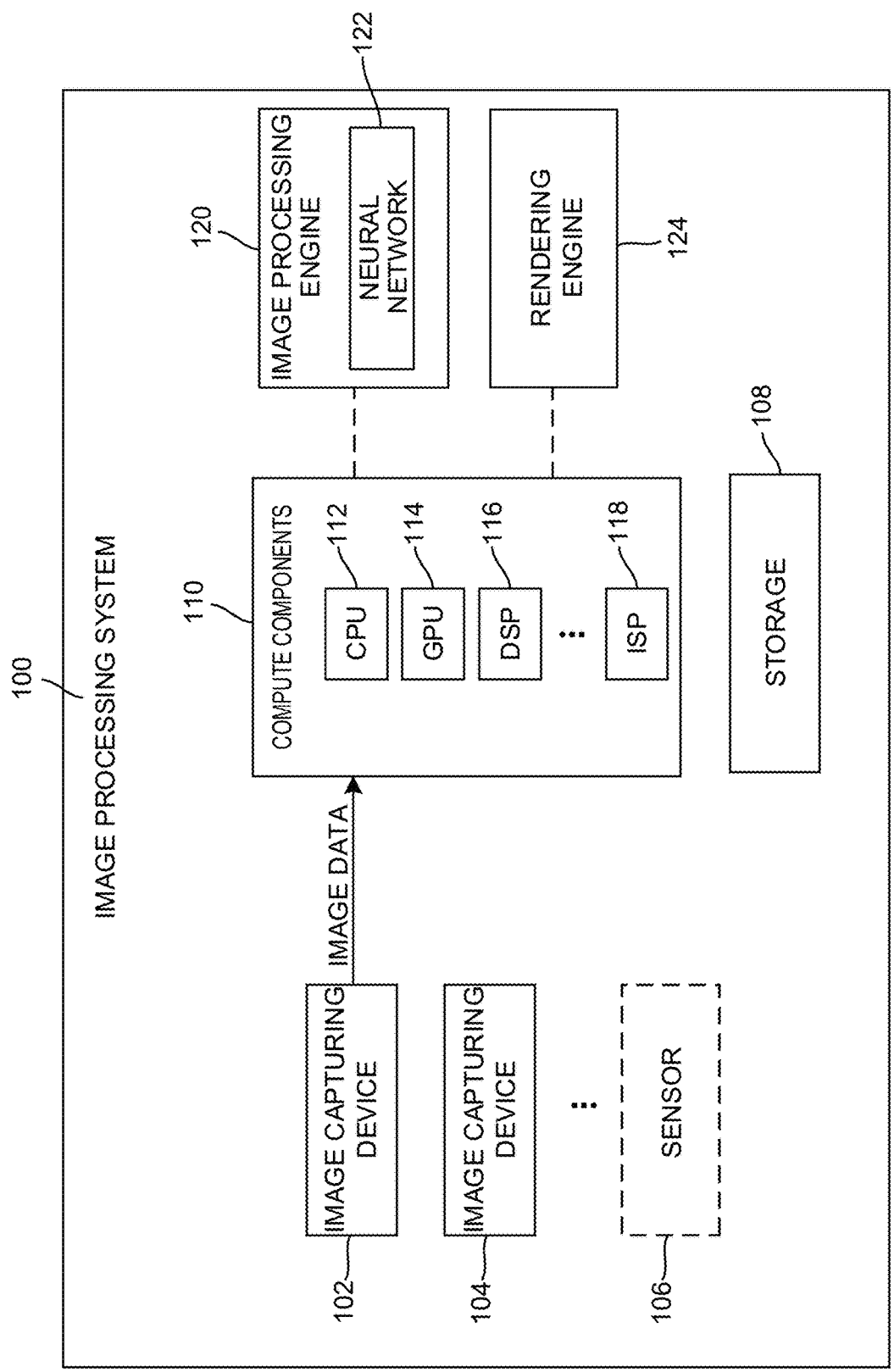
FIG. 1 is a block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, computing devices are increasingly being equipped with capabilities for capturing images, performing various image processing tasks and generating various image effects. Many of image processing tasks and effects, such as chroma keying, depth-of-field or "bokeh" effects, recognition tasks (e.g., object, face, and biometric recognition), feature extraction, image stylization, automation, machine vision, computer graphics, medical imaging, etc., rely on image segmentation to divide an image into multiple segments which can be analyzed or processed to perform the desired image processing tasks or generate the desired image effects. For example, cameras are often equipped with a portrait mode function that enables shallow depth-of-field ("bokeh") effects. A depth-of-field effect can bring a specific image region or object into focus, such as a foreground object or region, while blurring other regions or pixels in the image, such as background regions or pixels. The depth-of-field effect can be created using image segmentation techniques to identify and modify different regions or objects in the image, such as background and foreground regions or objects. In some examples, a depth-of-field effect can be created with the aid of depth information associated with the image.

However, image segmentation can often produce inaccurate, inconsistent, and/or poor results, which can negatively impact depth-of-field and other visual effects. In many cases, image segmentation results can vary based on a number of factors such as, for example and without limitation, the distance of the camera device to a target, the type of lens of the camera device, the size ratio of the image and the foreground target, a texture(s) of the foreground target and/or other portions of the image, a color(s) of the foreground target and/or other portions of the image, etc. For example, image segmentation for portrait mode can fail if a target appears too close or too far to the camera device. In many cases, as a foreground target (or a portion of a foreground target) is increasingly farther from a center of an image, it can be increasingly more difficult to detect a boundary or contour of the target (or a portion of the target) for segmentation and/or distinguish the target (or a portion of the target) from other objects/regions (e.g., background objects/regions) in the image.

The focal length, field-of-view (FOV), and/or type of lens used to capture the image can also cause variations in the segmentation result and various segmentation problems. For example, objects in images captured using a telephoto lens can appear closer and can contain less background information that can potentially obscure a foreground target's contour. However, the image boundary in such images often cuts (e.g., does not capture/include) a portion or region of the foreground target, which leads to less information about the target and can negatively affect the segmentation accuracy.

On the other hand, objects in images captured using a wide-angle lens can appear farther, and the images can more easily capture the full contour of the object. However, images captured using a wide-angle lens can often contain more information from side regions (e.g., image data corresponding to other objects and/or non-target regions) of the image (and/or regions that are farther from a center of the image), which can cause segmentation noise/interference and can make it increasingly more difficult to distinguish the target (or a portion of the target) from other objects/regions in the background such as side regions (or regions that are farther from a center of the image).

These and other issues can negatively impact the image segmentation results and, consequently, visual and image effects that rely on image segmentation, such as depth-of-field effects. In many cases, to trigger portrait mode and prevent the image segmentation for portrait mode from failing, the camera device has to be within a certain distance of a target. Often, a user has to move the camera device and the target farther or closer to each other to ensure the camera device and the target are within a certain distance to trigger portrait mode and/or prevent the image segmentation for portrait mode from failing. However, this approach is inconvenient, inflexible, and can nevertheless lead to poor segmentation results.

In some examples, the technologies described herein can leverage images with different field-of-views (FOVs) and/or captured using different types of lenses to improve and refine segmentation results. For example, the technologies described herein can produce more accurate, flexible, and consistent segmentation results. The segmentation results can also improve the quality and performance of image processing tasks and visual effects that rely on image segmentation such as, for example and without limitation, depth-of-field effects, computer graphics effects, image recognition tasks, image stylization, feature extraction tasks, and machine vision, among others.

In some examples, the technologies herein can leverage images captured by different cameras on a multi-camera apparatus. In some cases, the different cameras can have different FOVs or focal lengths. The images captured by the different cameras having the different FOVs or focal lengths can be used as inputs to generate improved and refined segmentation results. For example, in some cases, a multi-camera apparatus can use different cameras to capture a first image with a FOV (e.g., a wide-angle FOV, a narrow-angle FOV, zoomed FOV, etc.) and a second image with a different FOV. The first image can be used to generate a first segmentation mask and the second image can be used to generate a second segmentation mask. The first and second segmentation masks can be fused to generate improved segmentation results. The segmentation results can be used to render an effect on the first image, the second image, and/or a future image In some examples, the technologies herein can leverage images captured by a single camera with different FOVs or focal lengths. The images captured using different FOVs or focal lengths can be used as inputs to generate improved and refined segmentation results. For example, in some cases, a single camera can capture a first image with a FOV (e.g., a wide-angle FOV, a narrow-angle FOV, zoomed FOV, etc.) and a second image with a different FOV. The first image can be used to generate a first segmentation mask and the second image can be used to generate a second segmentation mask. The first and second segmentation masks can be fused to generate improved segmentation results. The segmentation results can be used to render an effect on the first image, the second image, and/or a future image.

Figure 6:
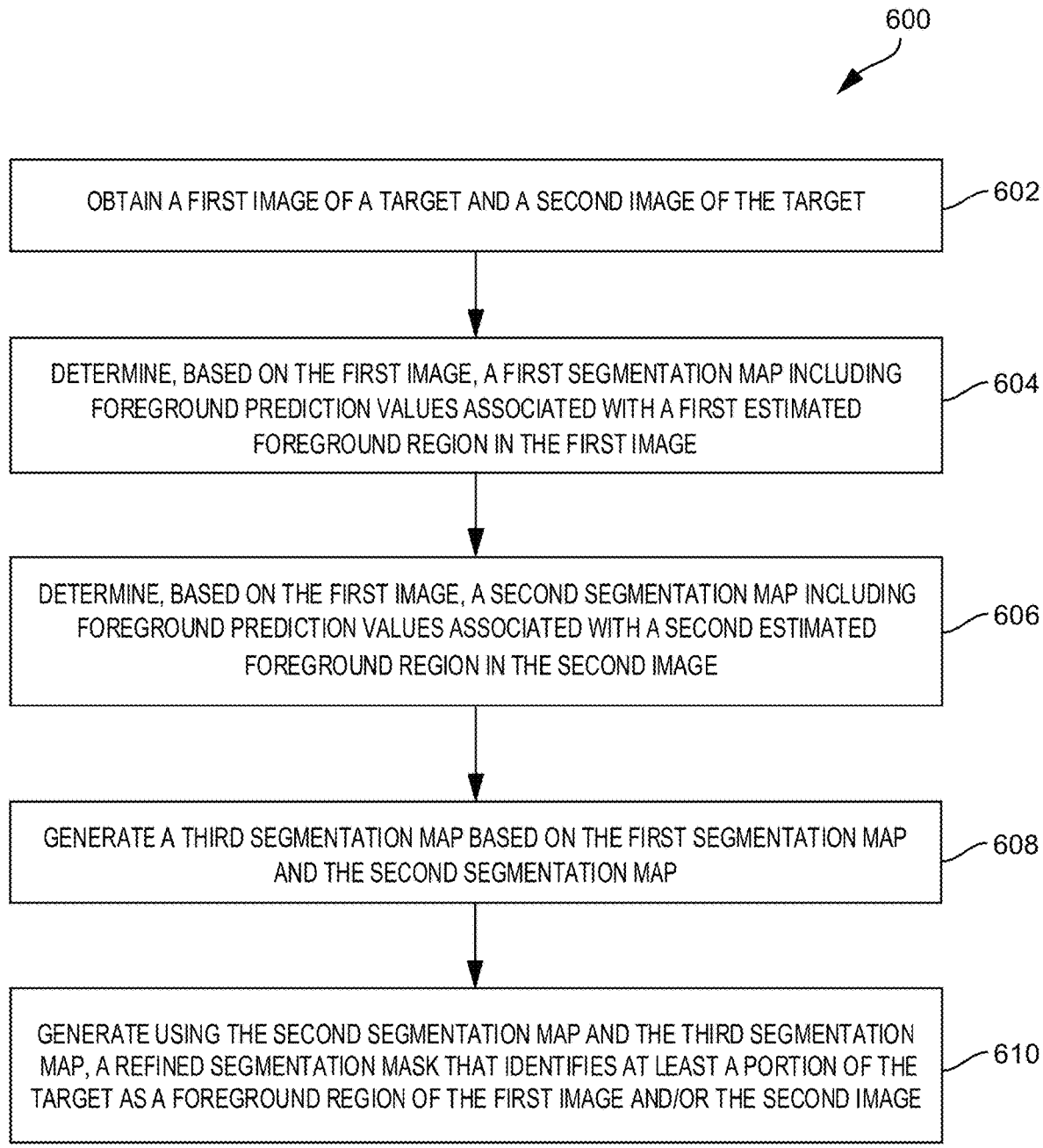
FIG. 6 is a flowchart of an example of a process for image segmentation using images with different field-of-views, in accordance with some examples of the present disclosure.
Figure 7:
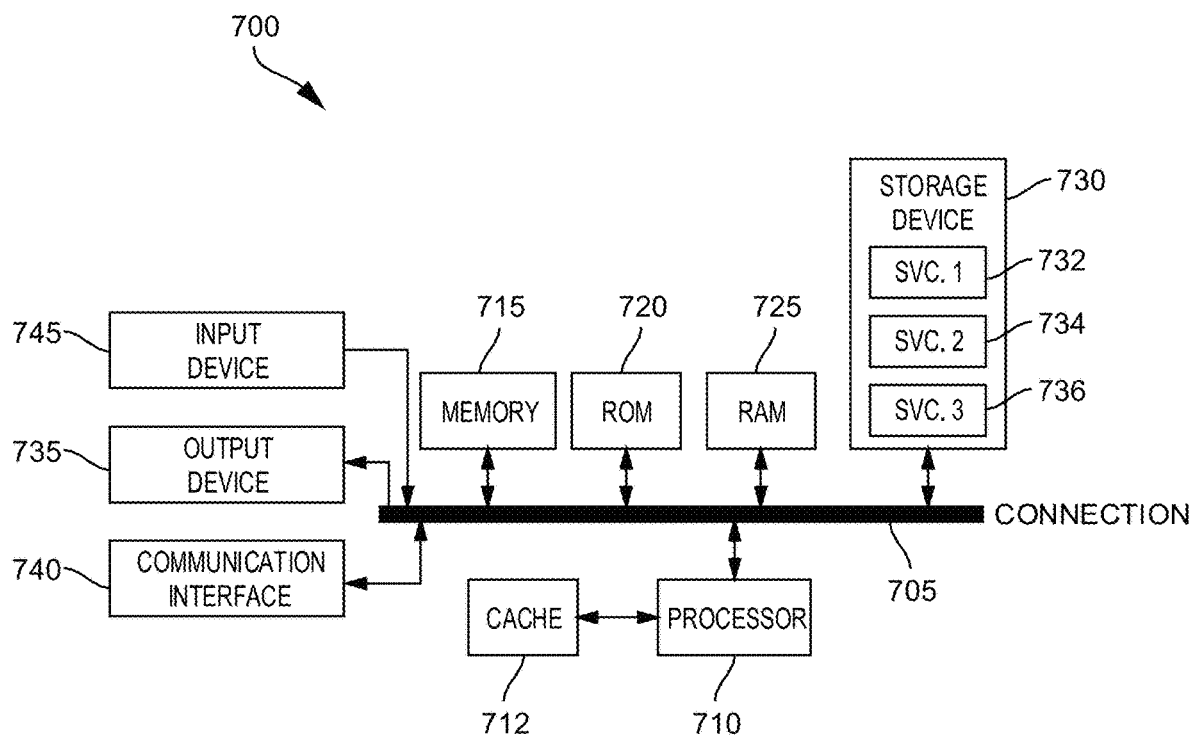
FIG. 7 illustrates an example computing device architecture, in accordance with some examples of the present disclosure.

In the following disclosure, systems, apparatuses (or devices), processes (or methods), and computer-readable media are provided for image segmentation. The present technologies will be described in the following disclosure as follows. The discussion begins with a description of example systems, technologies and techniques for image segmentation and foreground prediction, as illustrated in FIGS. 1 through 5. A description of an example process for image segmentation and foreground prediction, as illustrated in FIG. 6, will then follow. The discussion concludes with a description of an example computing device architecture, including example hardware components suitable for performing image segmentation and generating images with depth-of-field and other effects, as illustrated in FIG. 7. The disclosure now turns to FIG. 1

FIG. 1 is a diagram illustrating an example image processing system 100, in accordance with some examples. The image processing system 100 can perform various image processing tasks and generate various image processing effects as described herein. For example, the image processing system 100 can perform image segmentation and foreground prediction, generate depth-of-field images, generate chroma keying effects, perform feature extraction tasks, perform image recognition tasks, implement machine vision, and/or perform any other image processing tasks.

In some illustrative examples, the image processing system 100 can perform foreground prediction and generate depth-of-field images from one or more image capturing devices (e.g., cameras, image sensors, etc.). For example, in some implementations, the image processing system 100 can use images with different FOVs to perform image segmentation and generate a depth-of-field image effect. In some cases, the images with the different FOVs can be captured using capturing devices with different types of image sensors and/or lenses such as, for example, wide angle lenses, telephoto lenses (e.g., short telephoto, medium telephoto, etc.), standard lenses, zoom lenses, etc. While a depth-of-field effect is used herein as an example effect produced based on image segmentation results, the techniques described herein can be used for any image processing effect, such as chroma keying effects, feature extraction effects, image recognition effects, machine vision effects, image stylization effects, extended reality effects, any combination thereof, and/or for any other image processing effects.

In the example shown in FIG. 1, the image processing system 100 includes image capturing devices 102 and 104, a storage 108, compute components 110, an image processing engine 120, a neural network(s) 122, and a rendering engine 124. The image processing system 100 can also optionally include one or more sensors 106, such as light detection and ranging (LIDAR) sensor, a radar, an accelerometer, a gyroscope, a light sensor, an inertial measurement unit (IMU), a proximity sensor, etc. In some cases, the image processing system 100 can include multiple image capturing devices capable of capturing images with different FOVs. For example, in dual camera or image sensor applications, the image processing system 100 can include image capturing devices with different types of lenses (e.g., wide angle, telephoto, standard, zoom, etc.) capable of capturing images with different FOVs (e.g., different angles of view, different depths of field, etc.).

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a gaming console, a video streaming device, a drone, a computer in a car, an IoT (Internet-of-Things) device, a smart wearable device, an extended reality (XR) device (e.g., a head-mounted display, smart glasses, etc.), or any other suitable electronic device(s).

In some implementations, the image capturing device 102, the image capturing device 104, the other sensor 106, the storage 108, the compute components 110, the image processing engine 120, the neural network(s) 122, and the rendering engine 124 can be part of the same computing device. For example, in some cases, the image capturing device 102, the image capturing device 104, the other sensor 106, the storage 108, the compute components 110, the image processing engine 120, the neural network(s) 122, and the rendering engine 124 can be integrated into a smartphone, laptop, tablet computer, smart wearable device, gaming system, XR device, and/or any other computing device. However, in some implementations, the image capturing device 102, the image capturing device 104, the other sensor 106, the storage 108, the compute components 110, the image processing engine 120, the neural network(s) 122, and/or the rendering engine 124 can be part of two or more separate computing devices.

In some examples, the image capturing devices 102 and 104 can be any image and/or video capturing devices, such as a digital camera, a video camera, a smartphone camera, a camera device on an electronic apparatus such as a television or computer, a camera system, etc. In some cases, the image capturing devices 102 and 104 can be part of a camera or computing device such as a digital camera, a video camera, an IP camera, a smartphone, a smart television, a game system, etc. In some examples, the image capturing devices 102 and 104 can be part of a dual-camera assembly. The image capturing devices 102 and 104 can capture image and/or video content (e.g., raw image and/or video data), which can then be processed by the compute components 110, the image processing engine 120, the neural network(s) 122, and/or the rendering engine 124 as described herein.

In some cases, the image capturing devices 102 and 104 can include image sensors and/or lenses for capturing image and/or video data. The image capturing devices 102 and 104 can capture image and/or video data with different FOVs, including different angles of view, different depths of field, different sizes, etc. For example, in some cases, the image capturing devices 102 and 104 can include different image sensors having different FOVs. In other examples, the image capturing devices 102 and 104 can include different types of lenses with different FOVs, such as wide angle lenses, telephoto lenses (e.g., short telephoto, medium telephoto, etc.), standard lenses, zoom lenses, etc. In some examples, the image capturing device 102 can include one type of lens and the image capturing device 104 can include a different type of lens. In some cases, the image capturing devices 102 and 104 can be responsive to different types of light. For example, in some cases, the image capturing device 102 can be responsive to visible light and the image capturing device 104 can be responsive to infrared light.

In some examples, the image capturing device 102 can have different FOVs. In such examples, the image capturing device 102 can capture images with different FOVs. Similarly, in some examples, the image capturing device 104 can have different FOVs and can capture images with different FOVs.

The other sensor 106 can be any sensor for detecting and measuring information such as distance, motion, position, depth, speed, etc. Non-limiting examples of sensors include LIDARs, gyroscopes, accelerometers, magnetometers, radars, and IMUs. In one illustrative example, the sensor 106 can be a LIDAR configured to sense or measure distance and/or depth information which can be used when calculating depth-of-field and other effects. In some cases, the image processing system 100 can include other sensors, such as a machine vision sensor, a smart scene sensor, a speech recognition sensor, an impact sensor, a position sensor, a tilt sensor, a light sensor, etc.

The storage 108 can be any storage device(s) for storing data, such as image or video data for example. The storage 108 can store data from any of the components of the image processing system 100. For example, the storage 108 can store data or measurements from any of the image capturing devices 102 and 104, the image sensor 106, the compute components 110 (e.g., processing parameters, output images, calculation results, etc.), and/or any of the image processing engine 120, the neural network(s) 122, and/or the rendering engine 124 (e.g., output images, processing results, parameters, etc.). In some examples, the storage 108 can include a buffer for storing data (e.g., image data) for processing by the compute components 110.

In some implementations, the compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, object or image segmentation, computer vision, graphics rendering, XR (e.g., augmented reality, virtual reality, mixed reality, and the like), image/video processing, sensor processing, recognition (e.g., text recognition, object recognition, feature recognition, facial recognition, tracking or pattern recognition, scene recognition, etc.), foreground prediction, machine learning, filtering, depth-of-field effect calculations or renderings, and any of the various operations described herein. In some examples, the compute components 110 can implement the image processing engine 120, the neural network(s) 122, and the rendering engine 124. In other examples, the compute components 110 can also implement one or more other processing engines.

The operations of the image processing engine 120, the neural network(s) 122, and the rendering engine 124 can be implemented by one or more of the compute components 110. In one illustrative example, the image processing engine 120 and the neural network(s) 122 (and associated operations) can be implemented by the CPU 112, the DSP 116, and/or the ISP 118, and the rendering engine 124 (and associated operations) can be implemented by the GPU 114. In some cases, the compute components 110 can include other electronic circuits or hardware, computer software, firmware, or any combination thereof, to perform any of the various operations described herein.

In some cases, the compute components 110 can receive data (e.g., image data, video data, etc.) captured by the image capturing device 102 and/or the image capturing device 104, and process the data to generate output images having certain visual and/or image processing effects such as, for example, depth-of-field effects. For example, the compute components 110 can receive image data (e.g., one or more frames, etc.) captured by the image capturing devices 102 and 104, perform foreground prediction and image segmentation, and generate an output image having a depth-of-field effect. An image (or frame) can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome picture.

The compute components 110 can implement the image processing engine 120 and the neural network(s) 122 to perform various image processing operations and generate image effects such as, for example, a depth-of-field effect. For example, the compute components 110 can implement the image processing engine 120 and the neural network(s) 122 to perform feature extraction, superpixel detection, foreground prediction, spatial mapping, saliency detection, segmentation, pixel classification, cropping, upsampling/downsampling, blurring, segmentation, modeling, filtering, color correction, noise reduction, scaling, ranking, and/or other image processing tasks. The compute components 110 can process image data captured by the image capturing devices 102 and/or 104; image data in storage 108; image data received from a remote source, such as a remote camera, a server or a content provider; image data obtained from a combination of sources; etc.

In some examples, the compute components 110 can predict a foreground in image data captured by the image capturing devices 102 and 104, generate segmentation maps (e.g., probability maps), generate a refined or updated segmentation map based on multiple segmentation maps, generate a segmentation mask, and output an image with an effect, such as a depth-of-field effect, generated based on the segmentation mask. In some cases, the compute components 110 can use spatial information (e.g., a center prior map), probability maps, disparity information (e.g., a disparity map), image queries, saliency maps, etc., to segment objects and/or regions in one or more images and generate an output image with an image effect, such as a depth-of-field effect. In other cases, the compute components 110 can also use other information such as face detection information, sensor measurements (e.g., depth measurements), depth measurements, etc.

In some examples, the compute components 110 can perform segmentation (e.g., foreground-background segmentation) at (or nearly at) pixel-level accuracy, to generate an output image with a depth-of-field. The compute components 110 can perform segmentation (e.g., foreground-background segmentation) using images with different FOVs. For example, the compute components 110 can perform foreground-background segmentation using an image with a first FOV captured by image capturing device 102, and an image with a second FOV captured by image capturing device 104. The foreground-background segmentation can also enable (or can be used in conjunction with) other image adjustments or image processing operations such as, for example and without limitation, depth-enhanced and object-aware auto exposure, auto white balance, autofocus, tone mapping, etc.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 7.

As previously noted, image segmentation for portrait mode can fail if a foreground target appears too close to the image capturing device. For example, the image segmentation algorithm may fail to detect an object that appears too close to the image capturing device. Image segmentation results can also vary for images with different FOVs. The type of lens used to capture an image can impact the image segmentation performance. For example, objects in images captured using a telephoto lens can appear closer and can contain less background information that could potentially complicate foreground prediction (e.g., by adding noise). However, the boundary of the image captured using a telephoto lens often cuts (e.g., does not capture/include) a portion or region of a foreground target, which leads to less information about the target and can negatively affect the segmentation accuracy.

On the other hand, objects in images captured using a wide-angle lens can appear farther, and the images can more easily capture the full contour of the object. However, images captured using a wide-angle lens can often contain more information from side regions (e.g., image data corresponding to other objects and/or non-target regions) of the image (and/or regions that are farther from a center of the image), which can cause segmentation noise/interference and can make it increasingly more difficult to distinguish the target (or a portion of the target) from other objects/regions in the background such as side regions (or regions that are farther from a center of the image).

Figure 2A:
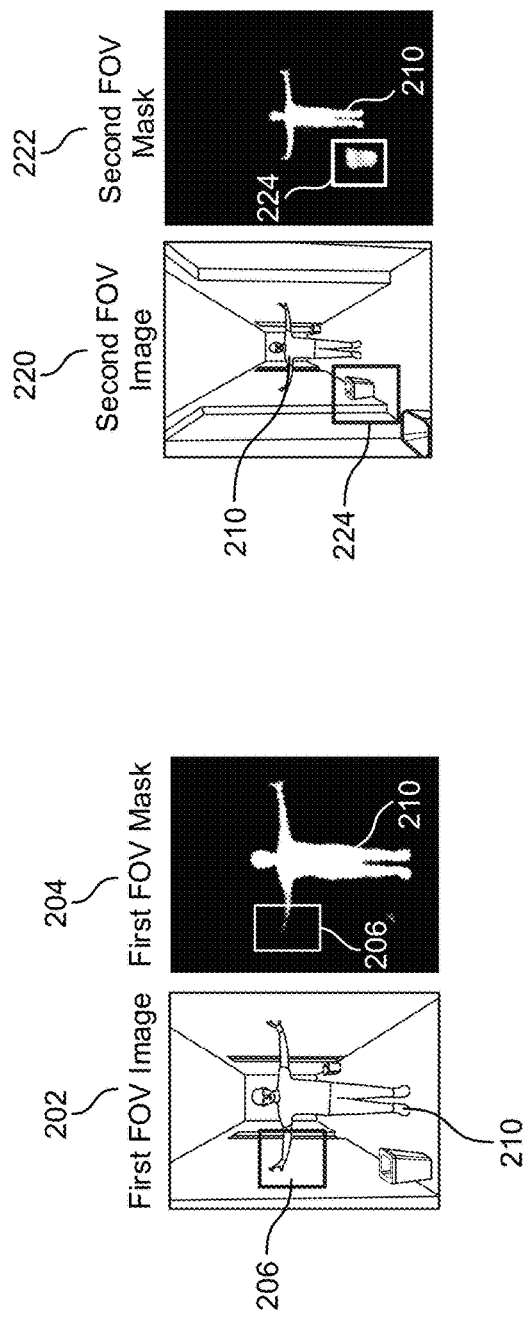
FIGS. 2A and 2B illustrate example differences between foreground predictions made from images of a target captured with different field-of-views, in accordance with some examples of the present disclosure.
Figure 2B:
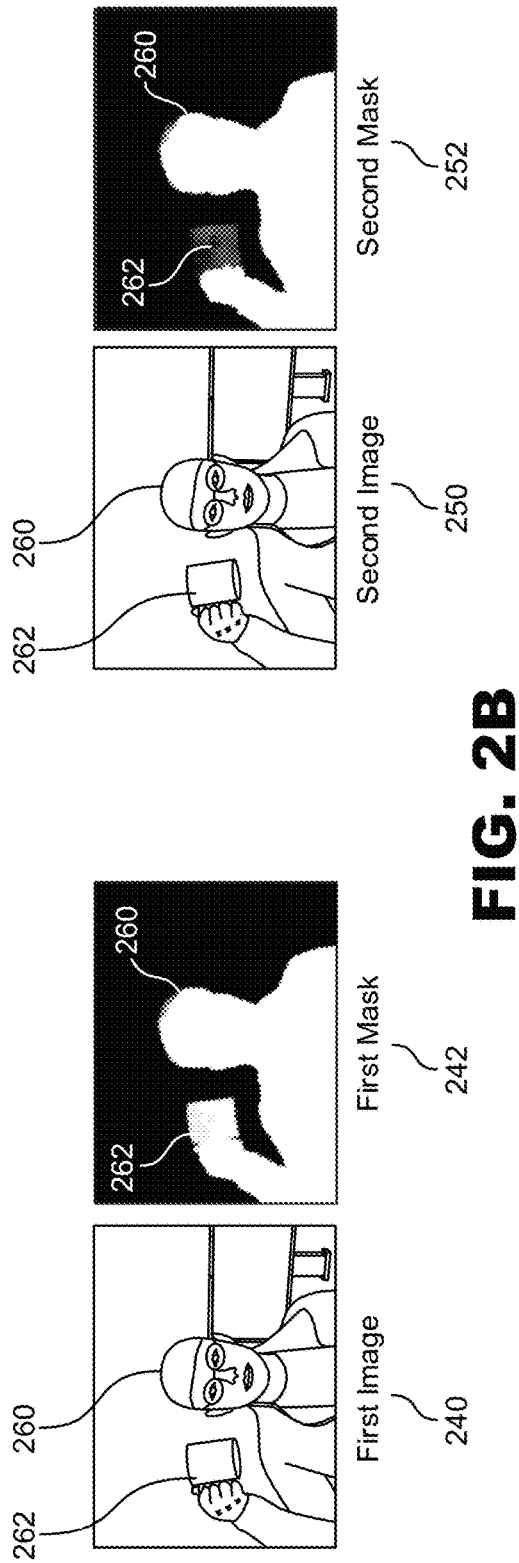

FIGS. 2A and 2B illustrate example differences between foreground predictions made from images of a target captured with different FOVs. With reference to FIG. 2A, image 202 can have a first FOV and image 220 can have a second FOV that is different than the first FOV. The images 202 and 220 both capture a target 210 which represents a foreground shape to be detected during a foreground prediction and/or image segmentation.

In this example, the first FOV of the image 202 has more magnification of the target 210 captured in the image 202 and a narrower angle of view, and the second FOV of the image 220 has less magnification of the target 210 and a wider angle of view. In some examples, the image 202 with the first FOV can be an image of the target 210 captured by a lens having a narrower angle of view and more magnification, such as a telephoto lens, a zoom lens, etc., and the image 220 with the second FOV can be an image of the target 210 captured by a lens having a wider angle of view and less magnification, such as a wide-angle lens.

The segmentation mask 204 illustrates a foreground prediction result generated based on the image 202 with the first FOV, and the segmentation mask 222 illustrates a foreground prediction result generated based on the image 220 with the second FOV. The different FOVs of the images 202 and 220 result in different ratios of the size of the target 210 and the size of the images 202 and 220. The ratio of a target size (e.g., the size of the target foreground shape) and an image size (e.g., the size of the image) can affect the segmentation accuracy and performance. For example, the ratio of a target size and an image size can cause a foreground prediction to miss, exclude, and/or fail to detect a portion(s) of the foreground target, or detect and include information and/or shapes (e.g., objects, people, animals, structures, etc.) that are not part of the foreground, such as background and/or non-target information and/or shapes.

As illustrated in the example in FIG. 2A, the segmentation mask 204 generated from the image 202 with the first FOV is missing a portion of the target 210 (e.g., a hand of the target 210) within a region 206 that is farther from a center of the image 202 and/or near an image boundary (e.g., near an edge/border of the image 202). While the image 202 has less background information, the larger ratio of the target size to the image size, which can correspond with a closer appearance of the target 210 and/or narrower FOV of the image 202, can cut/truncate a portion of the foreground information (e.g., the target's information) and affect the segmentation accuracy.

The segmentation mask 222 generated from the image 220 with the second FOV captures the target 210 without missing foreground information associated with the target 210, including the portion of the target 210 within the region 206. However, in addition to capturing the target 210, the segmentation mask 222 captures an object (e.g., a trashcan) within a background region 224 that should not be identified and/or treated as part of the foreground (e.g., target 210). While the smaller ratio of the target size to the image size resulting from the wider FOV of the image 220 allows the segmentation mask 222 to better capture the full contour of the foreground (e.g., target 210), it also results in the segmentation mask 222 capturing background and/or interfering information that should not be included/treated as part of the foreground.

In some cases, different images can result in segmentation inconsistencies even if the images have a same or similar FOV. For example, with reference to FIG. 2B, the first image 240 and the second image 250 both capture target 260 which represents a foreground shape to be detected during foreground prediction and/or image segmentation. The first image 240 and the second image 250 have similar or same FOVs. Nevertheless, the segmentation masks 242 and 252 generated from the first image 240 and the second image 250 are inconsistent.

For example, the segmentation mask 242 generated from the first image 240 captures the full contour of the target 260. On the other hand, the segmentation mask 252 generated from the second image 250 fails to fully capture a portion 262 of the target 260, which by contrast is captured in the segmentation mask 242. In this example, the portion 262 of the target 260 is a cup held by a user, and the foreground prediction should include the user and the cup held by the user. While the segmentation mask 242 accurately captures the cup and the user, the segmentation mask 252 captures the user but fails to properly capture the cup. As shown, the segmentation masks 242 and 252 produced from the two images 240 and 250 are inconsistent, which results in inconsistent segmentation results and can impact image processing tasks that rely on the segmentation results.

In some examples, to increase a segmentation consistency, quality, and performance, a segmentation mask can be generated from multiple images by fusing and/or leveraging segmentation information from the multiple images. In some cases, the multiple images can have different FOVs. Segmentation information from the images with the different FOVs can complement each other to avoid or limit segmentation inconsistencies and avoid or limit segmentation issues caused by a target's relative distance/depth, scale, view, etc. In some examples, a segmentation result can be generated using images captured using different types of lenses. The segmentation information from the images captured using the different types of lenses can be used together to refine a segmentation result and produce more consistent and accurate segmentation.

Figure 3A:
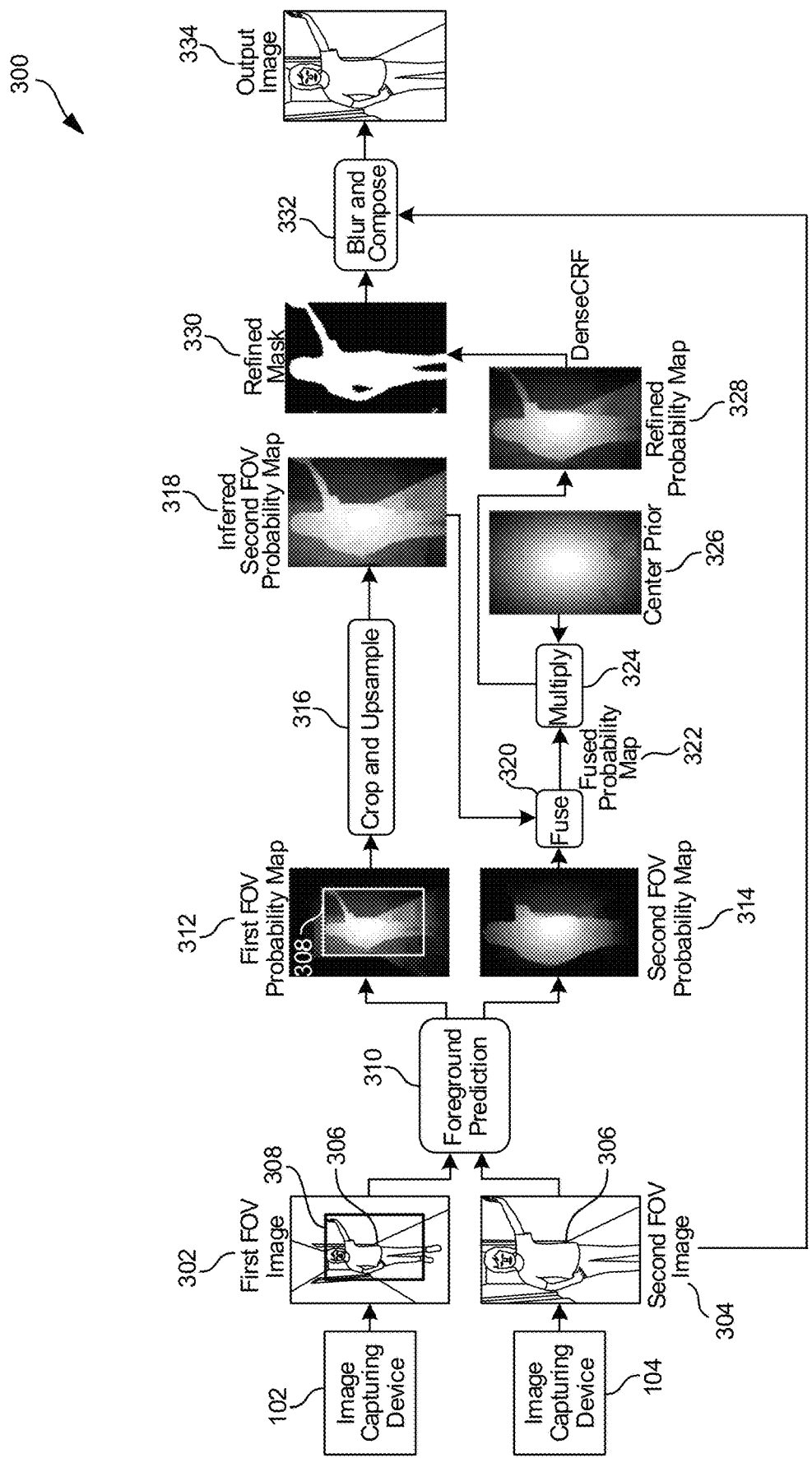
FIGS. 3A and 3B are diagrams illustrating example flows for image segmentation using images with different field-of-views, in accordance with some examples of the present disclosure.

FIG. 3A is a diagram illustrating an example flow 300 for image segmentation using images with different FOVs. The input to the example flow 300 includes image 302 and image 304. In some cases, image 302 and image 304 can be captured by image capturing device 102 and image capturing device 104, respectively. In some examples, the image capturing devices 102 and 104 can include different types of lenses and can capture images with different FOVs. For example, image capturing device 102 can capture image 302 using a FOV and image capturing device 104 can capture image 304 using a different FOV. In some cases, the images 302 and 304 can be captured by a same image capturing device (e.g., image capturing device 102 or 104) using different FOVs. In FIG. 3A, the image 302 has a different FOV than the image 304. For example, image 302 has a wider FOV than image 304.

The images 302 and 304 capture a target 306 representing a foreground shape. Image 302 has a wider FOV than image 304, and image 304 has a larger target size to image size ratio. The target 306 appears closer in image 304 than image 302. Given the wider FOV (and the smaller target size to image size ratio), image 302 captures a bigger portion of the foreground (e.g., target 306), but also captures more background and/or extra information (e.g., information that does not correspond to the target 306). For example, the target 306 in image 302 is shown within a bounding box 308 representing the content (e.g., scene) captured by image 304 (e.g., the full image 304) from image capturing device 104. Some or all of the information from the regions outside of the bounding box 308 (e.g., outside of image 304) represents background and/or extra information captured by image 302.

As can be seen in this example, image 302 captures more background and/or extra information (e.g., more information outside of the bounding box 308) than image 304. However, while image 304 captures less background and/or extra information than image 302, given the narrower FOV, image 304 also captures less foreground information (e.g., less of the target 306). For example, image 302 captures the full contour of the target 306 while image 304 cuts or truncates part of the target 306. As further described herein, the flow 300 can leverage information from both images to generate more accurate and consistent segmentation results.

The image processing system 100 can use image 302 and image 304 to perform foreground prediction 310. Based on the foreground prediction 310, the image processing system 100 can generate a probability map 312 for image 302 and a probability map 314 for image 304. The probability map 312 can contain a probability of each pixel or superpixel (e.g., group of pixels) in image 302 belonging to the target 306 to be identified as the foreground and/or separated from the background. The probability map 314 can contain a probability of each pixel or superpixel in image 304 belonging to the target 306 to be identified as the foreground and/or separated from the background.

In some cases, superpixels can represent different segments or regions of an image (e.g., image 302 or image 304). In some examples, a superpixel can include a group of pixels in the image. For example, in some cases, a superpixel can include a group of homogeneous or nearly homogeneous pixels in an image. As another example, a superpixel can include a group of pixels having one or more characteristics such that when the superpixel is rendered, the superpixel can have one or more uniform or consistent characteristics such as color, texture, brightness, semantics, etc. In some examples, superpixels can provide a perceptual grouping of pixels in an image.

In some examples, the image processing system 100 can perform the foreground prediction 310 using a deep neural network (DNN), such as neural network 122. In other examples, the image processing system 100 can perform the foreground prediction 310 using other techniques such as, for example, graph-based manifold ranking. In some examples, using graph-based manifold ranking, the image processing system 100 can rank the relevance between each pixel or superpixel in the input image (e.g., image 302, image 304) and the foreground (and/or regions estimated to be part of the foreground). In some cases, the manifold ranking can have a closed form to enable more efficient computation.

The probability map 312 generated by the foreground prediction 310 from image 302 includes and identifies the entire target 306 as part of the foreground, but also includes false positives from parts of the image 302 outside of the contours of the target 306. The probability map 314 generated by the foreground prediction 310 from image 304 contains less noise (e.g., less false positives) than the probability map 312, but does not include the entire target 306. Since the probability map 312 and the probability map 314 complement each other, the image processing system 100 can use both the probability map 312 and the probability map 314 to generate a refined probability map and segmentation result, as further described herein.

The image processing system 100 can crop and upsample 316 the probability map 312 to infer a probability map 318 with the FOV of the image 304, from the probability map 312 having the FOV of the image 302. The cropping and upsampling can reduce the size of the probability map 312 and increase its spatial resolution to a same (or similar size and resolution as the probability map 314). In some examples, based on the cropping and upsampling, the inferred probability map 318 can have a same (or similar) size and resolution as the probability map 314 generated for the image 304 to allow the image processing system 100 to fuse (or to optimize the fusing of) the probability map 314 and the inferred probability map 318. Since the inferred probability map 318 contains foreground information predicted from image 302 and the probability map 314 contains foreground information predicted from image 304, the inferred probability map 318 and the probability map 314 can be used together to leverage foreground information from image 302 and image 304 in order to obtain a refined foreground prediction result.

In some examples, when generating the inferred probability map 318 (e.g., after the cropping and upsampling), the image processing system 100 can perform guided filtering (e.g., based on image 304 and/or probability map 314) for image enhancement and/or texture smoothing. In some examples, the image processing system 100 can also perform normalization to adjust the range of pixel intensity values.

The image processing system 100 can fuse 320 the probability map 314 and the inferred probability map 318 to generate a fused probability map 322. The fused probability map 322 can combine, include, reflect, and/or refine foreground information from the probability map 314 generated from image 304 and foreground information from the inferred probability map 318 generated from image 302. In some examples, to fuse 320 the probability map 314 and the inferred probability map 318, the image processing system 100 can perform an element-wise addition based on the values in the probability map 314 and the inferred probability map 318. In some cases, the image processing system 100 can average the values in the probability map 314 and the inferred probability map 318 to generate an averaged probability map.

The image processing system 100 can multiply 324 the fused probability map 322 with a center prior map 326. The center prior map 326 can include spatial prior information. In some examples, the center prior map 326 can represent the probability or likelihood that the target 306 is located in a center region of the image as opposed to a border region(s) of the image. Since foreground objects/shapes are more likely to be located around or near a center of the image, the center prior map 326 can include higher probabilities for the center of the image and/or regions around/near the center of the image. The probabilities can decrease for regions that are farther away from the center of the image.

Given the higher probabilities for the image center (and nearby/surrounding regions), the center prior map 326 can help remove unwanted information from side regions in the fused probability map 322 (e.g., regions on/near the perimeter of the fused probability map 322 and/or farther from the center of the fused probability map 322). In some examples, the multiplication of the fused probability map 322 and the center prior map 326 can result in pixels or superpixels in the center (and closer to the center) of the fused probability map 322 being weighted more than pixels or superpixels on the sides of the fused probability map 322 and/or away from the center of the fused probability map 322.

In some examples, the image processing system 100 can generate the center prior map 326 by segmenting an original image associated with the probability map 314 (e.g., image 304) into a temporal or pixel-based representation. The image processing system 100 can then compute the distance of each superpixel to the center of the segmented image.

In some cases, the center prior map 326 can be used to enhance the fused probability map 322 by integrating the center prior to each superpixel $v_i$ based on the distance of the superpixel's averaged x-y coordinates coord($v_i$) to the image center O. The rationale in this example can be that foreground objects/shapes are more likely to be placed around the image center. To illustrate, considering the center prior CP for the image, the value of each superpixel $v_i$ can be computed as follows:

$$CP(v_i)=\exp(-\|coord(v_i)-O\|_2^2) \qquad \text{Equation (1)}$$

The output of the multiplication of the fused probability map 322 and the center prior map 326 can be a refined probability map 328. The image processing system 100 can generate a segmentation mask 330 based on the refined probability map 328. In some examples, the image processing system 100 can further refine the refined probability map 328 to generate the segmentation mask 330. In some implementations, the image processing system 100 can perform further refinement based on a fully connected conditional random field (CRF) or denseCRF. For example, the image processing system 100 can parse the refined probability map 328 through a denseCRF module for further refinement.

In some cases, the image processing system 100 can use the refined probability map 328 and the image 304 as the inputs for generating the segmentation mask 330. The image processing system 100 can use the image 304 and the refined probability map 328 to classify each pixel in the refined probability map 328 as a background pixel or a foreground pixel. The white portions of the segmentation mask 330 can correspond to pixels classified as foreground pixels and the black portions of the segmentation mask 330 can correspond to pixels classified as background pixels.

In some examples, the segmentation mask 330 can be a binary map representing background and foreground regions of the image. For example, to generate the segmentation mask 330, the image processing system 100 can binarize the refined probability map 328 to include 0 and 1 values corresponding to background pixels and foreground pixels, respectively.

In some cases, the image processing system 100 can use the segmentation mask 330 for foreground separation for certain image processing tasks and/or visual effects. In this example, the image processing system 100 can use the segmentation mask 330 to generate an output image 334 with a depth-of-field effect. The image processing system 100 can use the segmentation mask 330 and the image 304 to blur and compose 332 the output image 334. For example, the image processing system 100 can apply the segmentation mask 330 to the image 304 to blur regions of the image 304 outside of the foreground (e.g., target 306) and compose the output image 334 with the depth-of-field effect. In some cases, the image processing system 100 can blur the regions of the image 304 using a Gaussian function (e.g., Gaussian blur).

In some examples, the image processing system 100 can use the segmentation mask 330 and depth information to generate the output image 334. For example, the image processing system 100 can calculate a depth of pixels or superpixels in the image 304 and use the segmentation mask 330 and depth information to blur the regions in the image 304. In some cases, the image processing system 100 can perform depth prediction based on the pair of images 302 and 304. In other cases, the image processing system 100 can perform depth prediction based on measurements obtained from one or more depth sensors (e.g., other sensor 106) for the image 302 and/or the image 304.

While the flow 300 in FIG. 3A is described with respect to two input images with different FOVs, other examples can use more than two input images and/or FOVs. For example, in some cases, the input images for the flow 300 can include one or more wide-angle images generated using one or more wide-angle lenses, one or more ultra-wide-angle images generated using one or more ultra-wide angle lenses, one or more telephoto images generated using one or more telephoto lenses (e.g., a short telephoto lens, a medium telephoto lens, a super-telephoto lens, etc.), one or more images with one or more different and/or same FOVs (e.g., relative to the one or more wide-angle images and/or telephoto images) generated using one or more standard lenses, one or more zoom images generated using one or more zoom lenses, any other types of images generated from any other types of lenses, and/or any combination thereof. The input images 302 and 304 in FIG. 3A are non-limiting examples provided for explanation purposes.

Figure 3B:
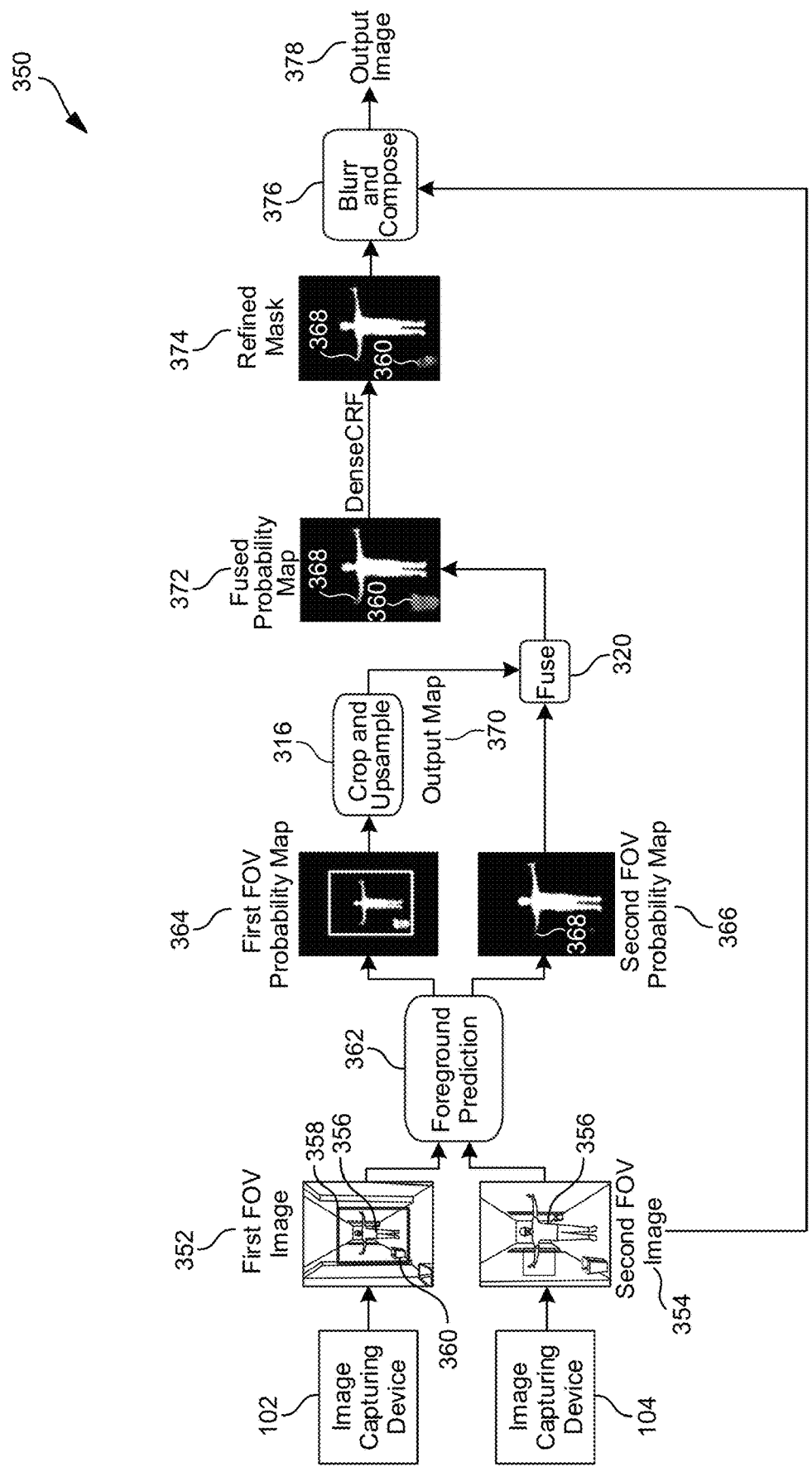

FIG. 3B is a diagram illustrating another example flow 350 for image segmentation using images with different FOVs. In this example, the images 352 and 354 capture a target 356 representing a foreground shape. The images 352 and 354 also capture a side object 360 that is not part of the foreground shape. Image 352 has a wider FOV than image 354, and image 354 has a larger target size to image size ratio. The target 356 appears closer in image 354 than image 352. Given the wider FOV (and the smaller target size to image size ratio), image 352 captures a bigger portion of the foreground (e.g., target 356), but also captures more background and/or extra information (e.g., information that does not correspond to the target 356). For example, the target 356 in image 352 is shown within a bounding box 358 representing the content (e.g., the scene) captured by image 354 (e.g., the full image 354). Some or all of the information from the regions outside of the bounding box 358 (e.g., outside of the image 354) represents background and/or extra information captured by image 352.

As can be seen in this example, image 352 captures more background and/or extra information (e.g., more information outside of the bounding box 358) than image 354. However, while image 354 captures less background and/or extra information than image 352, given the narrower FOV, image 354 also captures less foreground information (e.g., less of the target 356). For example, image 352 captures the full contour of the target 356 while image 354 cuts or truncates part of the target 356. As further described herein, the flow 350 can leverage information from both images to generate more accurate and consistent segmentation results.

The image processing system 100 can use image 352 and image 354 to perform foreground prediction 362. Based on the foreground prediction 362, the image processing system 100 can generate a probability map 364 for image 352 and a probability map 366 for image 354. The probability map 364 can contain a probability of each pixel or superpixel in image 352 belonging to the target 356 to be identified as the foreground and/or separated from the background. The probability map 366 can contain a probability of each pixel or superpixel in image 354 belonging to the target 356 to be identified as the foreground and/or separated from the background.

In this example, the foreground prediction 362 implements salient object detection to determine the region of interest (e.g., target 356) in the images 352 and 354. In some examples, the image processing system 100 can perform the foreground prediction 362, including the salient object detection, using a deep neural network (DNN), such as neural network 122. Salient object detection can determine a region of interest (e.g., target 356) in an image using a visual attention mechanism. For example, salient object detection can attempt to locate the most conspicuous/noticeable and eye-attracting regions (e.g., objects, shapes, etc.) in the image.

In some examples, the probability map 364 and the probability map 366 can each contain a probability of each pixel belonging to the target 356 to be separated from the background and/or other regions of the images 352 and 354. In some cases, the probability can be expressed as or include a saliency (e.g., based on the salient object detection), which can represent the likelihood of where the user's attention is likely to be within the image.

As illustrated in FIG. 3B, the probability map 364 generated by the foreground prediction 362 from image 352 includes and identifies the entire target 356 as part of the foreground, but also includes false positives from parts of the image 352 outside of the contours of the target 356. For example, in addition to including the entire target 356 as part of the foreground, the probability map 364 includes the side object 360 as part of the foreground. The probability map 366 generated by the foreground prediction 362 from image 354 contains less noise (e.g., less false positives) than the probability map 364, but does not include the entire target 356. For example, the probability map 366 does not include the side object 360 as part of the foreground, but is missing details from a portion 368 (e.g., a portion of an arm of the target user) of the target 356. The probability map 364 is better able to recover and/or preserve the details for the target 356, including the portion 368 of the target 356, but as previously noted also includes and identifies the side object 360.

Since the probability map 364 and the probability map 366 complement each other, the image processing system 100 can use both the probability map 364 and the probability map 366 to generate a refined probability map and segmentation result, as further described herein. The image processing system 100 can crop and upsample 316 the probability map 364 to generate an output map 370 representing a probability map with the FOV of the image 354. The output map 370 can be inferred from the probability map 364 having the FOV of the image 352. The cropping and upsampling can reduce the size of the probability map 364 and increase its spatial resolution to a same (or similar size and resolution as the probability map 366). In some examples, based on the cropping and upsampling, the output map 370 can have a same (or similar) size and resolution as the probability map 366 generated for the image 354.

The image processing system 100 can fuse 320 the probability map 366 and the output map 370 to generate a fused probability map 372. The fused probability map 372 can combine, include, reflect, and/or refine foreground information from the probability map 366 generated from image 354 and foreground information from the output map 370 generated from image 352. In some examples, to fuse 320 the probability map 366 and the output map 370, the image processing system 100 can perform an element-wise addition based on the values in the probability map 366 and the output map 370. In some cases, the image processing system 100 can average the values in the probability map 366 and the output map 370 to generate an averaged probability map.

As illustrated in FIG. 3B, the side object 360 has a dimmed appearance and/or intensity in the fused probability map 372. The dimmed appearance and/or intensity of the side object 360 reflects a less amount of details recovered for the side object 360 and/or a reduced probability that the side object 360 is part of the foreground region of interest (e.g., the target 356). When the output map 370 and the probability map 366 are fused, the probability (and/or the recovered details) associated with the side object 360 in the probability map 364 and the output map 370 can be reduced based on the foreground prediction information in the probability map 366, which calculated a lower or zero probability to the side object 360 and/or recovered less details of the side object 360.

The fused probability map 372 also has recovered more details of the portion 368 of the target 356 than the probability map 366. This is because the probability map 364 and the output map 370 fused with the probability map 366 included the details of the portion 368 of the target 356. By fusing the probability map 366 and the output map 370, details of the portion 368 of the target 356 are recovered from the output map 370, and details of the side object 360 accurately excluded in the probability map 366 are reduced in the fused probability map 372.

The image processing system 100 can refine the fused probability map 372 to generate the segmentation mask 374. As illustrated in FIG. 3B, the side object 360 has an even more dimmed appearance and/or intensity in the segmentation mask 374, and the portion 368 of the target 356 includes additional details (e.g., relative to the probability map 366 and the fused probability map 372). Here the side object 360 has been progressively dimmed from the probability map 364 to the fused probability map 372 and to the segmentation mask 374, and the details of the portion 368 of the target 356 have been increasingly recovered from the probability map 366 to the fused probability map 372 and to the segmentation mask 374.

In some implementations, the image processing system 100 can refine the fused probability map 372 based on a fully connected conditional random field (CRF) or denseCRF. For example, the image processing system 100 can parse the fused probability map 372 through a denseCRF module for further refinement. In some cases, the image processing system 100 can use the fused probability map 372 and the image 354 as the inputs for generating the segmentation mask 374. The image processing system 100 can use the image 354 and the fused probability map 372 to classify each pixel in the fused probability map 372 as a background pixel or a foreground pixel. The white portions of the segmentation mask 374 can correspond to pixels classified as foreground pixels and the black portions of the segmentation mask 374 can correspond to pixels classified as background pixels.

In some cases, the image processing system 100 can use the segmentation mask 374 for foreground separation for certain image processing tasks and/or visual effects. In this example, the image processing system 100 can use the segmentation mask 374 to generate an output image 378 with a depth-of-field effect. The image processing system 100 can use the segmentation mask 374 and the image 354 to blur and compose 374 the output image 378. For example, the image processing system 100 can apply the segmentation mask 374 to the image 354 to blur regions of the image 354 outside of the foreground (e.g., target 356) and compose the output image 378 with the depth-of-field effect. In some cases, the image processing system 100 can blur the regions of the image 354 using a Gaussian function (e.g., Gaussian blur).

In some examples, the image processing system 100 can use the segmentation mask 374 and depth information to generate the output image 378. For example, the image processing system 100 can calculate a depth of pixels or superpixels in the image 354 and use the segmentation mask 374 and depth information to blur the regions in the image 354. In some cases, the image processing system 100 can perform depth prediction based on the pair of images 352 and 354. In other cases, the image processing system 100 can perform depth prediction based on measurements obtained from one or more depth sensors (e.g., other sensor 106) for the image 352 and/or the image 354.

While the flow 350 in FIG. 3B is described with respect to two input images with different FOVs, other examples can use more than two input images and/or FOVs. For example, in some cases, the input images for the flow 350 can include one or more wide-angle images generated using one or more wide-angle lenses, one or more ultra-wide-angle images generated using one or more ultra-wide angle lenses, one or more telephoto images generated using one or more telephoto lenses (e.g., a short telephoto lens, a medium telephoto lens, a super-telephoto lens, etc.), one or more images with one or more different and/or same FOVs (e.g., relative to the one or more wide-angle images and/or telephoto images) generated using one or more standard lenses, one or more zoom images generated using one or more zoom lenses, any other types of images generated from any other types of lenses, and/or any combination thereof. The input images 352 and 354 in FIG. 3B are non-limiting examples provided for explanation purposes.

Figure 4:
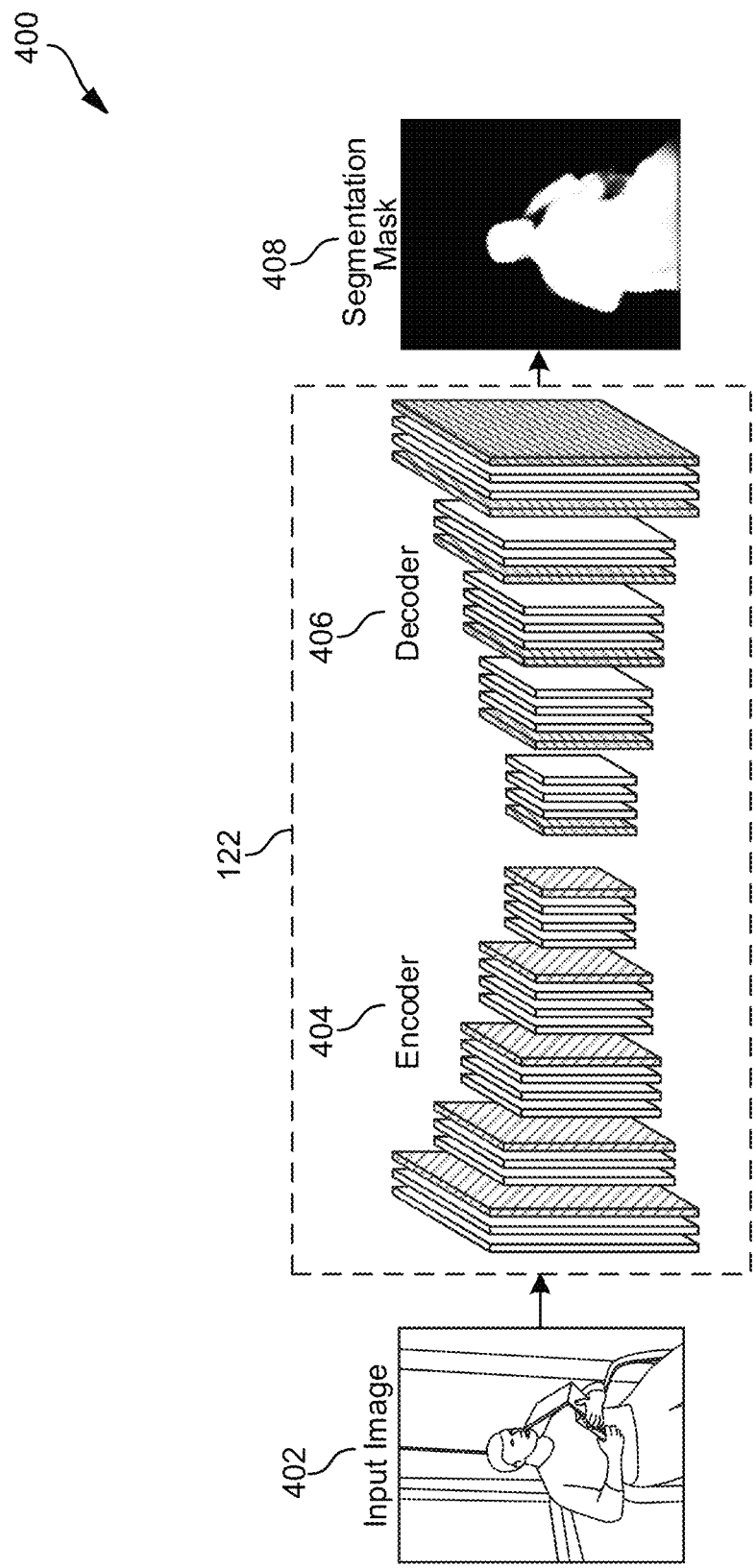
FIG. 4 is a diagram illustrating an example machine learning model for foreground prediction, in accordance with some examples of the present disclosure.

FIG. 4 is a diagram illustrating an example machine learning model 400 for foreground prediction. In this example, the machine learning model 400 can include a deep neural network (DNN) 122 that processes an input image 402 to detect and segregate foreground regions (e.g., foreground shapes, objects, pixels, etc.) in the input image 402. The DNN 122 can generate a segmentation mask 408 identifying the detected foreground regions.

In some examples, the DNN 122 can include a number of layers of interconnected nodes. Each node can represent a piece of information. Information associated with the nodes can be shared among the layers. Each layer can retain information as it is processed. In some cases, each node or interconnection between nodes can have a weight that is a set of parameters derived from a training of the DNN 122. For example, an interconnection between nodes can represent a piece of information learned about the interconnected nodes. The interconnection can have a numeric weight that can be tuned (e.g., based on a training dataset), allowing the DNN 122 to be adaptive to inputs and able to learn as more and more data is processed.

The DNN 122 can be pre-trained to process the features from the data in associated with the input image 402. In an example in which the DNN 122 is used to detect foreground regions in an image, the DNN 122 can be trained using training data that includes image data. The DNN 122 can be further trained as more input data, such as image data, is received. In some cases, the DNN 122 can be trained using supervised learning and/or reinforcement training. As the DNN 122 is trained, the DNN 122 can adjust the weights and/or biases of the nodes to optimize its performance.

In some cases, the DNN 122 can adjust the weights of the nodes using a training process such as backpropagation. Backpropagation can include a forward pass, a loss function, a backward pass, and a weight update. The forward pass, loss function, backward pass, and parameter update is performed for one training iteration. The process can be repeated for a certain number of iterations for each set of training data (e.g., image data) until the weights of the layers in the DNN 122 are accurately tuned.

The DNN 122 can include any suitable neural network. One example includes a convolutional neural network (CNN), which includes an input layer and an output layer, with multiple hidden layers between the input and output layers. The hidden layers of a CNN include a series of convolutional, nonlinear, pooling, fully connected and normalization layers. The DNN 122 can include any other deep network, such as an autoencoder, a deep belief nets (DBNs), a Recurrent Neural Networks (RNNs), among others.

In the example machine learning model 400 shown in FIG. 4, the DNN 122 has an encoder 404 and decoder 406 structure. The encoder 404 and the decoder 406 each have a number of layers. For example, the encoder 404 can include a number of convolutional layers and pooling layers. The convolutional layers can analyze input data. Each node of a convolutional layer can be connected to a region of nodes (e.g., pixels) of the input data (e.g., input image 402). The convolutional layer can be considered as one or more filters (each filter corresponding to a different activation or feature map), with each convolutional iteration of a filter being a node or neuron of the convolutional layer. Each connection between a node and a receptive field (region of nodes (e.g., pixels)) for that node learns a weight and, in some cases, an overall bias such that each node learns to analyze its particular local receptive field in the input image 402.

In some examples, at each convolutional iteration, the values of the filter can be multiplied with a corresponding number of the original pixel values of the image. The multiplications from each convolutional iteration can be summed together to obtain a total sum for that iteration or node. The process can be continued at a next location in the input data (e.g., image 402) according to the receptive field of a next node in the convolutional layer. Processing the filter at each unique location of the input volume can produce a number representing the filter results for that location, resulting in a total sum value being determined for each node of the convolutional layer.

In some cases, the convolutional layers can perform batch normalization to normalize inputs to the layers for each batch of data. The batch normalization can make the DNN 122 faster and more stable by adjusting and scaling activations. The convolutional layers can also apply a layer activation function, such as a rectifier linear unit (ReLU) function. In some examples, a pooling layer can be applied after certain convolutional layers. The pooling layer can be used to simplify the information in the output from convolutional layers. For example, the pooling layer can take each activation map output from a convolutional layer and generate a condensed activation map (or feature map) using a pooling function. Max-pooling is one example of a function performed by a pooling layer. Other forms of pooling functions can be used by the pooling layer, such as average pooling or other suitable pooling functions.

A pooling function (e.g., a max-pooling filter) can be applied to activation maps included in convolutional layers. The pooling function (e.g., max-pooling) can reduce, aggregate, or concatenate outputs or feature representations in the input (e.g., image 402). Max-pooling (as well as other pooling methods) offer the benefit that there are fewer pooled features, and can reduce the number of parameters needed in later layers.

The decoder 406 can include a number of upsampling, convolutional, and softmax layers. The upsampling layers can increase the dimensions of the input data. Each upsampling layer can be followed by a number of convolutional layers which perform convolutions on the upsampled data from the upsampling layers. In some examples, the last layer of the decoder 406 can be a softmax layer. The softmax layer can perform a softmax function to perform classification. In some examples, the softmax layer can classify pixels, superpixels, and/or regions of the input image 402 as foreground or background. In some examples, the softmax layer can determine foreground prediction probabilities. The output of the decoder 406 can be the segmentation mask 408 which provides a foreground prediction for the input image 402.

Figure 5:
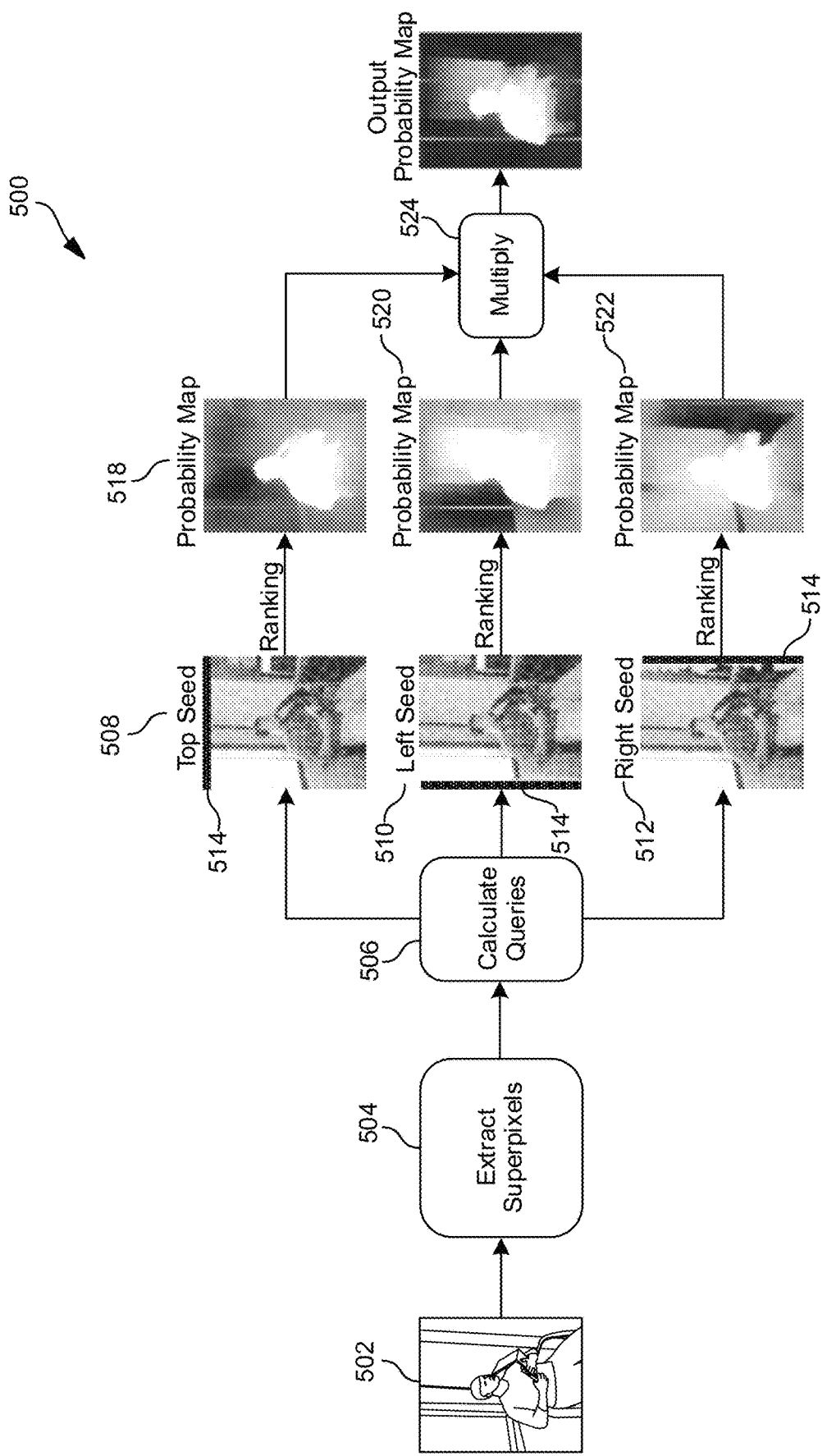
FIG. 5 is a diagram illustrating an example foreground prediction process based on manifold ranking, in accordance with some examples of the present disclosure.

FIG. 5 is a diagram illustrating an example foreground prediction process 500 based on manifold ranking. In this example, the image processing system 100 can extract superpixels 504 from an input image 502. For example, the image processing system 100 can segment or partition the image 502 into multiple superpixels. In some implementations, the image processing system 100 can extract the superpixels in the image 502 using a superpixel segmentation algorithm, such as a simple linear iterative clustering (SLIC) algorithm which can perform local clustering of pixels. In some examples, the superpixel extraction can help preserve image structures while abstracting unnecessary details. The superpixels can also serve as the computational unit for ranking as further described below.

The superpixels can represent different segments or regions of the image 502. In some cases, the superpixels can include groups of pixels in the image 502. For example, a superpixel can include a group of homogeneous or nearly homogeneous pixels in the image 502. In other examples, a superpixel can include a group of pixels having one or more characteristics such that when the superpixel is rendered, the superpixel can have one or more uniform or consistent characteristics such as color, texture, brightness, semantics, etc. In some cases, the superpixels can provide a perceptual grouping of pixels in the image.

The homogeneous or nearly homogeneous pixels referenced above can include pixels that are consistent, uniform, or significantly similar in texture, color, brightness, semantics, and/or any other characteristic(s). In some implementations, while objects in an image may be divided into multiple superpixels, a specific superpixel may not be divided by an object's boundary. In some implementations, some or all of the pixels in a superpixel can be spatially related (e.g., spatially contiguous). For example, the pixels in a superpixel can include neighboring or adjacent pixels from the image.

The image processing system 100 can calculate queries 506 based on the superpixels extracted from the image 502. The image processing system 100 can create queries 508, 510, and 512 that are used to generate probability maps 518, 520, 522. In some examples, the queries 508, 510, and 512 can include images including the extracted superpixels. The images can also include contrast superpixel regions 514. The contrast superpixel regions 514 can include superpixels marked by the image processing system 100 with one or more distinctive attributes such as, for example, color, texture, brightness, and/or any other characteristics. The distinctive attributes can help distinguish the superpixels in the contrast superpixel regions 514 from other superpixels in the queries 508, 510, and 512.

In the illustrative example of FIG. 5, the queries 508, 510, and 512 can include a top seed (e.g., query 508), a left seed (e.g., query 510), and a right seed (e.g., query 512). In other examples, the queries 508, 510, and 512 can include more or less queries, and/or other types of seeds such as, for example, a bottom seed. The top seed (e.g., query 508) can include a contrast superpixel region 514 on a top edge (e.g., perimeter) of the top seed. The contrast superpixel region 514 can include superpixels marked by a distinguishing color that differentiates superpixels in the contrast superpixel region 514 from other superpixels in the top seed.

The left seed (e.g., query 510) can include a contrast superpixel region 514 on a left edge (e.g., perimeter) of the left seed. The contrast superpixel region 514 can include superpixels marked by a distinguishing color that differentiates superpixels in the contrast superpixel region 514 from other superpixels in the left seed.

The right seed (e.g., query 512) can include a contrast superpixel region 514 on a right edge (e.g., perimeter) of the right seed. The contrast superpixel region 514 can include superpixels marked by a distinguishing color that differentiates superpixels in the contrast superpixel region 514 from other superpixels in the right seed.

In some cases, the image processing system 100 can utilize the contrast difference between the contrast superpixel regions 514 in the queries 508, 510, and 512 and the rest of the queries 508, 510, and 512 (e.g., the other superpixels in the queries 508, 510, and 512) to estimate the probability maps 518, 520, and 522. In some examples, the image processing system 100 can perform manifold ranking to estimate the probability maps 518, 520, and 522. When performing the manifold ranking, the image processing system 100 can use the contrast difference between the contrast superpixel regions 514 and the other superpixels in the queries 508, 510, and 512 to estimate the probability maps 518, 520, and 522. The contrast difference can help calculate ranking scores for the probability maps 518, 520, and 522.

In some examples, the manifold ranking can include a graph-based ranking algorithm used to compute the probability maps 518, 520, and 522. For example, in some cases, the image processing system 100 can construct a graph used with the queries 508, 510, and 512 to generate a manifold ranking result (e.g., the probability maps 518, 520, and 522). In some cases, the image processing system 100 can construct a graph $\mathcal{G} = (\mathcal{V}, \mathcal{E})$, where $\mathcal{V}$ and $\mathcal{E}$ respectively represent vertices and edges in an image (e.g., query 508, query 510, query 512). In graph $\mathcal{G}$, each vertex $v_i \in \mathcal{V}$ can be defined to be a superpixel. The edge $e_{ij} \in \mathcal{E}_1$ can be added if superpixels $v_i$ and $v_j$ are spatially connected in the image, and weighted based on the feature distance calculated for superpixels $v_i$ and $v_j$. In some examples, the edge weight can be determined by the feature distance or similarity calculated for superpixels $v_i$ and $v_j$ as follows:

$$a_{ij} = \exp\left(-\frac{d(p_i, p_j)}{\sigma_c} - \gamma \frac{d(q_i, q_j)}{\sigma_s}\right) \quad \text{Equation (2)}$$

where $p_i$ and $q_i$ respectively denote the averaged color and semantic representations of pixels in the superpixel $v_i$, $p_j$ and $q_j$ respectively denote the averaged color and semantic representations of pixels in the superpixel $v_j$, $d()$ is the $\mathcal{X}^2$ feature distance, and $\gamma$ represents a weight applied to the semantic features.

In some examples, in the example Equation (2), the value of constant $\sigma_c$ can be set to the average pair-wise distance between all superpixels under their color features, and the value of $\sigma_s$ can be set to the average pair-wise distance between all superpixels under their semantic features. It should be noted that the color and semantic features are non-limiting examples provided here for explanation purposes, and other implementations may utilize more, less, or different types of features. For example, in some cases, Equation (2) can be implemented using only one type of features such as color or semantic features, or a different combination of features such as color, semantic, and/or texture features.

In some cases, the image processing system 100 can construct a Laplacian matrix $L \in \mathbb{R}^{N \times N}$ of graph $\mathcal{G}$ with affinity matrix $A = [\alpha_{ij}] N \times N$, where N denotes the total number of superpixels in the image. Moreover, in some implementations, the image processing system 100 can infer labels for nodes (e.g., superpixels) on the graph and use the graph labeling on the manifold structure of data (e.g., the image). In a given a dataset $X = [x_1, \ldots, x_l, x_{l+1}, \cdot, x_N] \in \mathbb{R}^{M \times N}$, where M denotes the feature dimensions of each data point, some data points can be labeled queries and the rest can be ranked according to their relevance to the queries.

For example, let $f: X \rightarrow [0,1]$ be a ranking function assigning value $f_i$ to each data point $x_i$, where 0 is a background data point value and 1 is a foreground data point value. Here, f can be viewed as a vector $f = [f_1, \ldots, f_N]^T$. Moreover, let $\mathcal{Y} = [\mathcal{Y}_1, \mathcal{Y}_2, \ldots, \mathcal{Y}_N]^T$ denote an indication vector, in which $\mathcal{Y}_i = 1$ if $\mathcal{X}_1$ is a query and $\mathcal{Y}_i = 0$ otherwise. Given graph $\mathcal{G}$, a degree matrix can be $D = \deg\{d_{11}, \ldots, d_{nn}\}$ where $d_{ii} = \Sigma_j \alpha_{ij}$ and $\mu$ is a weighting constant. In this example, the optimal ranking of queries can then be computed by solving the following minimization or optimization problem:

$$f^* = \operatorname*{argmin}_{f} \frac{1}{2}\left(\sum_{i,j=1}^{N} a_{ij} \left\| \frac{f_i}{\sqrt{d_{ii}}} - \frac{f_j}{\sqrt{d_{jj}}} \right\|^2 + \mu \sum_{i=1}^{N} \|f_i - y_i\|^2\right) \quad \text{Equation (3)}$$

Solving Equation (3) above can help ensure that similar data points are assigned similar ranking values, while keeping the ranked results close to the original indication vector $\mathcal{Y}$. In some examples, the minimum solution can be computed by setting the derivative of Equation (3) to zero. In some cases, the closed form solution of the ranking function can be expressed as follows:

$$f^* = (D - \alpha A)^{-1} y \quad \text{Equation (4)}$$

In some cases, the indicator vector $\mathcal{Y}$ can be formed and used to compute a ranking vector $f^*$ using Equation (4).

The manifold ranking can leverage spatial information to infer the potential foreground of the image 502 (e.g., the probability maps 518, 520, and 522). In some cases, the manifold ranking can borrow distilled information from a user to help with the foreground prediction, which can help predict the true salient object. For example, the manifold ranking can use information provided by a user about an image being segmented, such as an indication of one or more shapes and/or objects in the image, an indication of one or more background regions, an indication of one or more foreground regions, and/or any other information about the image, image contents, and/or image characteristics.

Having disclosed example systems, technologies, and concepts, the disclosure now turns to the example process 600 shown in FIG. 6. The steps outlined herein are examples and can be implemented in any combination thereof, including combinations that exclude, add, or modify certain steps.

The process 600 can be implemented to perform various image processing tasks and/or effects. For example, in some cases, the process 600 can be implemented to perform segmentation (e.g., foreground prediction) and produce an image segmentation-based effect, such as a depth-of-field effect, a chroma keying effect, an image stylization effect, an artistic effect, a computational photography effect, among others. In other examples, the process 600 can be implemented to perform other image-segmentation based effects or processing tasks such as, for example and without limitation, feature extraction, image recognition (e.g., object or face recognition), machine vision, XR, automation, and/or any other image-segmentation based effects and/or processing tasks.

At block 602, the process 600 can include obtaining a first image (e.g., image 302 or 352) of a target (e.g., target 306 or 356) and a second image (e.g., image 304 or 354) of the target. The first image can have a first FOV and the second image can have a second FOV that is different than the first FOV.

In some examples, the first image and the second image can be captured using different image capturing devices (e.g., image capturing device 102 and 104) having different FOVs or focal lengths. In some examples, the first image and the second image can be captured using different image sensors and/or lenses. The different image sensors and/or lenses can produce images with different FOVs. In some cases, the first image and the second image can be captured using different lenses, and the different lenses can include one or more telephoto lenses, wide-angle lenses, ultra-wide-angle lenses, standard lenses, and/or zoom lenses. In some cases, the first image and the second image can be captured using a same image capturing device. For example, an image capturing device having different FOVs can capture the first and second image using the different FOVs.

At block 604, the process 600 can include determining, based on the first image, a first segmentation map (e.g., first probability map 312 or 364) including foreground prediction values associated with a first estimated foreground region in the first image.

In some examples, determining the first segmentation map can include extracting superpixels from the first image; generating a set of image queries (e.g., queries 508, 510, 512), each image query including the extracted superpixels and a different border region of superpixels marked by one or more distinguishing pixel attributes (e.g., color, texture, brightness, etc.); generating a set of segmentation probability maps (e.g., probability maps 518, 520, 522) based on the set of image queries; and generating the first segmentation map by multiplying the set of segmentation probability maps.

In some examples, a segmentation probability map of each image query is generated using one or more manifold ranking functions to estimate foreground probabilities at least partly based on a difference between the different border region of superpixels and one or more other regions of superpixels associated with the image query.

At block 606, the process 600 can include determining, based on the second image, a second segmentation map (e.g., second probability map 314 or 366) including foreground prediction values associated with a second estimated foreground region in the second image.

In some examples, determining the second segmentation map can include extracting superpixels from the second image; generating an additional set of image queries (e.g., queries 508, 510, 512), each additional image query including the extracted superpixels from the second image and a different border region of superpixels marked by one or more distinguishing pixel attributes (e.g., color, texture, brightness, etc.); generating an additional set of segmentation probability maps (e.g., probability maps 518, 520, 522) based on the additional set of image queries; and generating the second segmentation map by multiplying the additional set of segmentation probability maps.

In some examples, a segmentation probability map of each additional image query is generated using one or more manifold ranking functions to estimate foreground probabilities at least partly based on a difference between the different border region of superpixels and one or more other regions of superpixels associated with the additional image query.

In some examples, the first segmentation map and/or the second segmentation map can be generated using a deep neural network (e.g., DNN 122). In some cases, the first segmentation map and/or the second segmentation map can be generated using a trained neural network. In some cases, the trained neural network can be a deep neural network. In other examples, the first segmentation map and/or the second segmentation map can be generated using a non-DNN technique such as graph-based manifold ranking.

At block 608, the process 600 can include generating a third segmentation map (e.g., inferred second probability map 318 or output map 370) based on the first segmentation map and the second segmentation map. In some examples, the third segmentation map can include the first segmentation map modified according to a size of the second image and/or a resolution of the second image.

In some examples, generating the third segmentation map can include cropping the first segmentation map to the size of the second image. In some examples, generating the third segmentation map can also include upsampling, after cropping the first segmentation map, the first segmentation map according to the resolution of the second image.

At block 610, the process 600 can include generating, using the second segmentation map and the third segmentation map, a refined segmentation mask (e.g., refined segmentation mask 330 or 374) that identifies at least a portion of the target as a foreground region of the first image and/or the second image.

In some examples, generating the refined segmentation mask can includes generating a fused segmentation map (e.g., fused probability map 322 or fused probability map 372) by fusing (e.g., combining, concatenating, merging, etc.) the second segmentation map and the third segmentation map, and generating the refined segmentation mask based on the fused segmentation map. In some examples, a denseCRF model can be applied to the fused segmentation map to generate the refined segmentation mask. In some cases, fusing the second segmentation map and the third segmentation map can include averaging the foreground prediction values in the second segmentation map and foreground prediction values in the third segmentation map. In some examples, the fused segmentation map can include the averaged foreground prediction values.

In some cases, generating the fused segmentation map can include fusing the second segmentation map and the third segmentation map, and multiplying a center prior map (e.g., center prior map 326) with an output of the fusing of the second segmentation map and the third segmentation map.

In some aspects, the process 600 can include calculating foreground probabilities for superpixels in the first image and/or the second image, and generating the center prior map based on the foreground probabilities. In some examples, each foreground probability is calculated based on a distance of an associated superpixel to an image center.

In some aspects, the process 600 can include generating an edited image based on the refined segmentation mask. In some examples, the edited image can be based on the first image or the second image. In some cases, the edited image can include one or more effects such as, for example and without limitation, a visual effect, an extended reality effect, an image processing effect, a blurring effect, an image recognition effect, a segmentation effect, a computer graphics effect, a chroma keying effect, an image stylization effect, etc. In an illustrative example, the edited image can include a blurring effect.

In some aspects, the process 600 can include generating an output image (e.g., output image 334 or 378) including the first image or the second image modified to include a blurring effect. In some examples, the blurring effect can be based on the refined segmentation mask. In some cases, generating the output image can include applying, based on the refined segmentation mask, the blurring effect to one or more image regions (e.g., one or more background regions) located outside of the foreground region. In some examples, the blurring effect can include a depth-of-field effect where the one or more image regions are at least partly blurred and the foreground region is at least partly in focus.

In some cases, the depth-of-field effect can be generated using depth information and/or measurements from one or more sensors, such as one or more LIDARs, radars, light sensors, depth sensors, etc. In some examples, the depth information and/or measurements can be derived using stereo vision, LIDAR techniques, and/or phase detection (PD).

In some aspects, the process 600 can include determining, based on a third image, a fourth segmentation map. In some examples, the fourth segmentation map can include foreground values associated with an estimated foreground region in the third image. The third image can be captured from a same or different image capturing device as the first and/or second images. In some examples, the process 600 can include generating segmentation maps in response to a user selection of an imaging mode (e.g., portrait mode, green screening, etc.).

While the process 600 is described with respect to a first image and a second image with different FOVs, other examples can use more than two images and/or FOVs. For example, in some cases, the process 600 can use one or more wide-angle images generated using one or more wide-angle lenses, one or more ultra-wide-angle images generated using one or more ultra-wide angle lenses, one or more telephoto images generated using one or more telephoto lenses (e.g., a short telephoto lens, a medium telephoto lens, a super-telephoto lens, etc.), one or more images with one or more different and/or same FOVs (e.g., relative to the one or more wide-angle images and/or telephoto images) generated using one or more standard lenses, one or more zoom images generated using one or more zoom lenses, any other types of images generated from any other types of lenses, and/or any combination thereof.

In some examples, the process 600 may be performed by one or more computing devices or apparatuses. In one illustrative example, the process 600 can be performed by the image processing system 100 shown in FIG. 1 and/or one or more computing devices with the computing device architecture 700 shown in FIG. 7. In some cases, such a computing device or apparatus may include a processor, microprocessor, microcomputer, or other component of a device that is configured to carry out the steps of the process 600. In some examples, such computing device or apparatus may include one or more sensors configured to capture image data. For example, the computing device can include a smartphone, a head-mounted display, a mobile device, a camera, a tablet computer, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement various techniques described herein. For example, the computing device architecture 700 can implement at least some portions of the image processing system 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics.

The processor 710 can include any general purpose processor and a hardware or software service, such as service 1732, service 2734, and service 3736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 175, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus comprising:
   memory; and
   one or more processors coupled to the memory, the one or more processors being configured to:
   obtain a first image of a target and a second image of the target, the first image having a first field-of-view (FOV) and the second image having a second FOV that is different than the first FOV;
   determine, based on the first image, a first segmentation map comprising foreground values associated with a first estimated foreground region in the first image;
   determine, based on the second image, a second segmentation map comprising foreground values associated with a second estimated foreground region in the second image;
   generate a third segmentation map based on the first segmentation map and the second segmentation map; and
   generate, using the second segmentation map and the third segmentation map, a refined segmentation mask that identifies at least a portion of the target as a foreground region of at least one of the first image and the second image.

2. The apparatus of claim 1, wherein generating the refined segmentation mask comprises:
   generating a fused segmentation map by fusing the second segmentation map and the third segmentation map; and
   generating the refined segmentation mask based on the fused segmentation map.

3. The apparatus of claim 1, wherein the one or more processors are configured to:
   generate an edited image based on the refined segmentation mask.

4. The apparatus of claim 3, wherein the edited image is based on one of the first image or the second image.

5. The apparatus of claim 3, wherein the edited image includes at least one of a visual effect, an extended reality effect, an image processing effect, a blurring effect, an image recognition effect, a segmentation effect, a computer graphics effect, a chroma keying effect, and an image stylization effect.

6. The apparatus of claim 3, wherein the edited image includes a blurring effect.

7. The apparatus of claim 1, wherein generating the third segmentation map comprises:
   cropping the first segmentation map to a size of the second image; and
   after cropping the first segmentation map, upsampling the first segmentation map according to a resolution of the second image.

8. The apparatus of claim 1, wherein the first segmentation map and the second segmentation map are generated using a trained neural network.

9. The apparatus of claim 8, wherein the trained neural network comprises a deep neural network.

10. The apparatus of claim 1, wherein the first image is received from a first camera and the second image is received from a second camera.

11. The apparatus of claim 10, further comprising the first camera and the second camera.

12. The apparatus of claim 11, wherein the first camera is responsive to visible light and the second camera is responsive to infrared light.

13. The apparatus of claim 1, wherein the first image and the second image are received from a first camera.

14. The apparatus of claim 1, wherein the one or more processors are configured to:
   determine, based on a third image, a fourth segmentation map comprising foreground values associated with a third estimated foreground region in the third image.

15. The apparatus of claim 14, wherein the first image is received from a first camera, the second image is received from a second camera, and the third image is received from a third camera.

16. The apparatus of claim 1, wherein the one or more processors are configured to generate segmentation masks in response to a user selection of an imaging mode.

17. A method comprising:
   obtaining a first image of a target and a second image of the target, the first image having a first field-of-view (FOV) and the second image having a second FOV that is different than the first FOV;
   determining, based on the first image, a first segmentation map comprising foreground prediction values associated with a first estimated foreground region in the first image;
   determining, based on the second image, a second segmentation map comprising foreground prediction values associated with a second estimated foreground region in the second image;
   generating a third segmentation map based on the first segmentation map and the second segmentation map; and
   generating, using the second segmentation map and the third segmentation map, a refined segmentation mask that identifies at least a portion of the target as a foreground region of at least one of the first image and the second image.

18. The method of claim 17, wherein generating the refined segmentation mask comprises:
   generating a fused segmentation map by fusing the second segmentation map and the third segmentation map; and
   generating the refined segmentation mask based on the fused segmentation map.

19. The method of claim 17, further comprising:
   generating an edited image based on the refined segmentation mask.

20. The method of claim 19, wherein the edited image is based on one of the first image or the second image.

21. The method of claim 19, wherein the edited image includes at least one of a visual effect, an extended reality effect, an image processing effect, a blurring effect, an image recognition effect, a segmentation effect, a computer graphics effect, a chroma keying effect, and an image stylization effect.

22. The method of claim 19, wherein the edited image includes a blurring effect.

23. The method of claim 17, wherein generating the third segmentation map comprises:
   cropping the first segmentation map to a size of the second image; and
   after cropping the first segmentation map, upsampling the first segmentation map according to a resolution of the second image.

24. The method of claim 17, wherein the first segmentation map and the second segmentation map are generated using a trained neural network.

25. The method of claim 17, wherein the trained neural network comprises a deep neural network.

26. The method of claim 17, wherein the first image is received from a first camera and the second image is received from a second camera.

27. The method of claim 26, wherein the first camera is responsive to visible light and the second camera is responsive to infrared light.

28. The method of claim 17, further comprising:
determining, based on a third image, a fourth segmentation map comprising foreground values associated with a third estimated foreground region in the third image.

29. The method of claim 17, wherein at least one of the first segmentation map, the second segmentation map, and the third segmentation map is generated in response to a user selection of an imaging mode.

30. A non-transitory computer-readable storage medium having stored thereon instructions which, when executed by one or more processors, cause the one or more processors to:
obtain a first image of a target and a second image of the target, the first image having a first field-of-view (FOV) and the second image having a second FOV that is different than the first FOV;
determine, based on the first image, a first segmentation map comprising foreground prediction values associated with a first estimated foreground region in the first image;
determine, based on the second image, a second segmentation map comprising foreground prediction values associated with a second estimated foreground region in the second image;
generate a third segmentation map based on the first segmentation map and the second segmentation map; and
generate, using the second segmentation map and the third segmentation map, a refined segmentation mask that identifies at least a portion of the target as a foreground region of at least one of the first image and the second image.

* * * * *